United States Patent
Gaede et al.

(10) Patent No.: US 10,165,321 B2
(45) Date of Patent: *Dec. 25, 2018

(54) FACILITATING PLACESHIFTING USING MATRIX CODES

(71) Applicant: DISH Technologies L.L.C., Englewood, CO (US)

(72) Inventors: Jason Gaede, Denver, CO (US); Germar Schaefer, Monument, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/595,621

(22) Filed: May 15, 2017

(65) Prior Publication Data

US 2017/0318324 A1 Nov. 2, 2017

Related U.S. Application Data

(63) Continuation of application No. 13/864,474, filed on Apr. 17, 2013, now Pat. No. 9,686,584, which is a
(Continued)

(51) Int. Cl.
*H04N 21/435* (2011.01)
*H04N 21/436* (2011.01)
(Continued)

(52) U.S. Cl.
CPC ........... *H04N 21/435* (2013.01); *H04N 5/765* (2013.01); *H04N 21/4126* (2013.01);
(Continued)

(58) Field of Classification Search
CPC ........... H04N 21/4126; H04N 21/4147; H04N 21/4227; H04N 21/4312; H04N 21/432;
(Continued)

(56) References Cited

U.S. PATENT DOCUMENTS

| 4,809,325 A | 2/1989 | Hayashi et al. |
| 4,837,414 A | 6/1989 | Edamula |

(Continued)

FOREIGN PATENT DOCUMENTS

| CA | 2 634 951 A1 | 1/2010 |
| CA | 2 760 146 C | 11/2010 |

(Continued)

OTHER PUBLICATIONS

European Search Report for EP 11 846 858.6 dated Jun. 12, 2017, all pages.
(Continued)

*Primary Examiner* — Jeremy S Duffield
(74) *Attorney, Agent, or Firm* — Kilpatrick Townsend & Stockton LLP (57) ABSTRACT

A method for providing a user of a target device with placeshifted content. The method includes detecting, utilizing the target device, a matrix code associated with an audio/visual program. Data encoded in the matrix code includes program identifying information and elapsed time information with respect to the program. The method further includes generating, utilizing the target device, a request for the program based at least in part on the encoded data. The method also includes transmitting, utilizing the target device, the program request across a network.

20 Claims, 4 Drawing Sheets

Related U.S. Application Data continuation of application No. 13/037,333, filed on Feb. 28, 2011, now Pat. No. 8,443,407.

(51) Int. Cl.

| | | |
|---|---|---|
| *H04N 21/433* | (2011.01) | |
| *H04N 21/431* | (2011.01) | |
| *H04N 21/432* | (2011.01) | |
| *H04N 21/472* | (2011.01) | |
| *H04N 5/765* | (2006.01) | |
| *H04N 21/41* | (2011.01) | |
| *H04N 21/4147* | (2011.01) | |
| *H04N 21/4227* | (2011.01) | |
| *H04N 21/426* | (2011.01) | |
| *H04N 21/442* | (2011.01) | |
| *H04N 21/63* | (2011.01) | |

(52) U.S. Cl.
CPC ..... *H04N 21/4147* (2013.01); *H04N 21/4227* (2013.01); *H04N 21/42684* (2013.01); *H04N 21/432* (2013.01); *H04N 21/436* (2013.01); *H04N 21/4312* (2013.01); *H04N 21/4325* (2013.01); *H04N 21/4334* (2013.01); *H04N 21/43615* (2013.01); *H04N 21/43622* (2013.01); *H04N 21/44222* (2013.01); *H04N 21/472* (2013.01); *H04N 21/632* (2013.01)

(58) Field of Classification Search
CPC ........... H04N 21/4325; H04N 21/4334; H04N 21/435; H04N 21/436; H04N 21/43615; H04N 21/43622; H04N 21/472; G06K 7/1413–7/1434; G06F 17/30879
See application file for complete search history.

(56) References Cited

U.S. PATENT DOCUMENTS

| | | |
|---|---|---|
| 5,500,681 A | 3/1996 | Jones |
| 5,510,603 A | 4/1996 | Hess et al. |
| 5,581,636 A | 12/1996 | Skinger |
| 5,602,377 A | 2/1997 | Beller et al. |
| 5,703,349 A | 12/1997 | Meyerson et al. |
| 5,929,849 A | 7/1999 | Kikinis |
| 5,959,285 A | 9/1999 | Schuessler |
| 5,963,265 A | 10/1999 | Bae et al. |
| 5,978,855 A | 11/1999 | Metz et al. |
| 6,006,990 A | 12/1999 | Ye et al. |
| 6,058,238 A | 5/2000 | Ng |
| 6,263,502 B1 | 7/2001 | Morrison et al. |
| 6,438,751 B1 | 8/2002 | Voyticky et al. |
| 6,512,919 B2 | 1/2003 | Ogasawara |
| 6,556,273 B1 | 4/2003 | Wheeler et al. |
| 6,704,929 B1 | 3/2004 | Ozer et al. |
| 6,766,956 B1 | 7/2004 | Boylan et al. |
| 6,983,304 B2 | 1/2006 | Sato |
| 7,046,161 B2 | 5/2006 | Hayes |
| 7,206,029 B2 | 4/2007 | Cohen-Solal |
| 7,206,409 B2 | 4/2007 | Antonellis et al. |
| 7,221,405 B2 | 5/2007 | Basson et al. |
| 7,244,404 B2 | 7/2007 | Rosenberg et al. |
| 7,328,848 B2 | 2/2008 | Xia et al. |
| 7,349,668 B2 | 3/2008 | Ilan et al. |
| 7,369,180 B2 | 5/2008 | Xing |
| 7,373,652 B1 | 5/2008 | Bayrakeri et al. |
| 7,387,250 B2 | 6/2008 | Muni |
| 7,394,519 B1 | 7/2008 | Mossman et al. |
| 7,424,976 B2 | 9/2008 | Muramatsu |
| 7,443,449 B2 | 10/2008 | Momosaki et al. |
| 7,487,527 B2 | 2/2009 | Ellis et al. |
| 7,587,601 B2 | 9/2009 | Levy et al. |
| 7,604,172 B2 | 10/2009 | Onogi |
| 7,612,748 B2 | 11/2009 | Tateuchi |
| 7,624,417 B2 | 11/2009 | Dua |
| 7,624,916 B2 | 12/2009 | Sato et al. |
| 7,673,297 B1 | 3/2010 | Arsenault et al. |
| 7,797,430 B2 | 9/2010 | Ichieda |
| 7,818,675 B2 | 10/2010 | Maruyama et al. |
| 7,841,531 B2 | 11/2010 | Onogi |
| 8,010,977 B2 | 8/2011 | Hogyoku |
| 8,045,054 B2 | 10/2011 | Bishop et al. |
| 8,186,572 B2 | 5/2012 | Herzig |
| 8,292,166 B2 | 10/2012 | Gomez et al. |
| 8,327,403 B1 | 12/2012 | Chilvers et al. |
| 8,364,018 B2 | 1/2013 | McArdle |
| 8,380,993 B2 | 2/2013 | Chen et al. |
| 8,386,339 B2 | 2/2013 | Minnick et al. |
| 8,408,466 B2 | 4/2013 | Gratton |
| 8,427,455 B2 | 4/2013 | Matsuda |
| 8,430,302 B2 | 4/2013 | Minnick et al. |
| 8,439,257 B2 | 5/2013 | Beals et al. |
| 8,443,407 B2 | 5/2013 | Gaede et al. |
| 8,468,610 B2 | 6/2013 | Beals et al. |
| 8,511,540 B2 | 8/2013 | Anguiano |
| 8,534,540 B2 | 9/2013 | Gratton et al. |
| 8,550,334 B2 | 10/2013 | Gratton et al. |
| 8,553,146 B2 | 10/2013 | Kennedy |
| 8,746,554 B2 | 6/2014 | Gomez et al. |
| 8,786,410 B2 | 7/2014 | Beals et al. |
| 8,827,150 B2 | 9/2014 | Gratton et al. |
| 8,833,640 B2 | 9/2014 | Martch et al. |
| 8,856,853 B2 | 10/2014 | Casagrande et al. |
| 8,875,173 B2 | 10/2014 | Kilaru et al. |
| 8,886,172 B2 | 11/2014 | Gomez |
| 8,931,031 B2 | 1/2015 | Schaefer |
| 9,092,830 B2 | 7/2015 | Gomez et al. |
| 9,148,686 B2 | 9/2015 | Gerhards et al. |
| 9,280,515 B2 | 3/2016 | Gaede et al. |
| 9,329,966 B2 | 5/2016 | Dugan et al. |
| 9,367,669 B2 | 6/2016 | Gratton |
| 9,571,888 B2 | 2/2017 | Casagrande et al. |
| 9,596,500 B2 | 3/2017 | Gomez et al. |
| 9,652,108 B2 | 5/2017 | Mountain |
| 9,736,469 B2 | 8/2017 | Schaefer et al. |
| 9,781,465 B2 | 10/2017 | Kilaru et al. |
| 9,792,612 B2 | 10/2017 | Dugan et al. |
| 2001/0037297 A1 | 11/2001 | McNair |
| 2001/0052133 A1 | 12/2001 | Pack et al. |
| 2002/0011521 A1 | 1/2002 | Lahey et al. |
| 2002/0027612 A1 | 3/2002 | Brill et al. |
| 2002/0049980 A1 | 4/2002 | Hoang |
| 2002/0065728 A1 | 5/2002 | Ogasawara |
| 2002/0082931 A1 | 6/2002 | Siegel et al. |
| 2002/0112250 A1 | 8/2002 | Koplar et al. |
| 2002/0195495 A1 | 12/2002 | Melick et al. |
| 2003/0018711 A1 | 1/2003 | Imanishi |
| 2003/0050854 A1 | 3/2003 | Showghi et al. |
| 2003/0077065 A1 | 4/2003 | Scholten et al. |
| 2003/0112974 A1 | 6/2003 | Levy |
| 2003/0121978 A1 | 7/2003 | Rubin et al. |
| 2003/0125092 A1 | 7/2003 | Burnhouse et al. |
| 2003/0151562 A1 | 8/2003 | Kulas |
| 2003/0172374 A1 | 9/2003 | Vinson et al. |
| 2004/0005900 A1 | 1/2004 | Zilliacus |
| 2004/0019691 A1 | 1/2004 | Daymond et al. |
| 2004/0026508 A1 | 2/2004 | Nakajima et al. |
| 2004/0044532 A1 | 3/2004 | Karstens |
| 2004/0046790 A1 | 3/2004 | Agarwal et al. |
| 2004/0049672 A1 | 3/2004 | Nollet et al. |
| 2004/0133907 A1 | 7/2004 | Rodriguez et al. |
| 2004/0226042 A1 | 11/2004 | Ellis |
| 2004/0260850 A1 | 12/2004 | Yu et al. |
| 2005/0009564 A1 | 1/2005 | Hayaashi et al. |
| 2005/0011958 A1 | 1/2005 | Fukasawa et al. |
| 2005/0015800 A1 | 1/2005 | Holcomb |
| 2005/0015815 A1 | 1/2005 | Shoff et al. |
| 2005/0055281 A1 | 3/2005 | Williams |
| 2005/0059339 A1 | 3/2005 | Honda et al. |
| 2005/0097618 A1 | 5/2005 | Arling et al. |
| 2005/0107135 A1 | 5/2005 | Deeds et al. |
| 2005/0125301 A1 | 6/2005 | Muni |
| 2005/0149967 A1 | 7/2005 | Hanley et al. |
| 2005/0163483 A1 | 7/2005 | Rassool |

(56) References Cited

U.S. PATENT DOCUMENTS

| | | |
|---|---|---|
| 2005/0180804 A1 | 8/2005 | Andrew et al. |
| 2005/0203854 A1 | 9/2005 | Das |
| 2005/0258250 A1 | 11/2005 | Melick et al. |
| 2005/0262217 A1* | 11/2005 | Nonaka ............ H04N 21/42646 709/217 |
| 2005/0262548 A1 | 11/2005 | Shimojo et al. |
| 2005/0264694 A1 | 12/2005 | Ilan et al. |
| 2006/0064700 A1 | 3/2006 | Ludvig et al. |
| 2006/0065733 A1 | 3/2006 | Lee et al. |
| 2006/0071076 A1 | 4/2006 | Tamayama |
| 2006/0079247 A1 | 4/2006 | Ritter |
| 2006/0086796 A1 | 4/2006 | Onogi |
| 2006/0090179 A1 | 4/2006 | Hsu et al. |
| 2006/0095286 A1 | 5/2006 | Kimura |
| 2006/0124742 A1 | 6/2006 | Rines et al. |
| 2006/0174317 A1 | 8/2006 | Onomatsu et al. |
| 2006/0196950 A1 | 9/2006 | Kiliccote |
| 2006/0203339 A1 | 9/2006 | Kleinberger et al. |
| 2006/0208088 A1 | 9/2006 | Sekiguchi |
| 2006/0265731 A1 | 11/2006 | Matsuda |
| 2007/0008344 A1 | 1/2007 | Medina |
| 2007/0011709 A1 | 1/2007 | Katz et al. |
| 2007/0016934 A1 | 1/2007 | Okada et al. |
| 2007/0016936 A1 | 1/2007 | Okada et al. |
| 2007/0017350 A1 | 1/2007 | Uehara |
| 2007/0019215 A1 | 1/2007 | Yu |
| 2007/0063050 A1 | 3/2007 | Attia et al. |
| 2007/0073585 A1 | 3/2007 | Apple et al. |
| 2007/0143788 A1 | 6/2007 | Abernethy et al. |
| 2007/0159522 A1 | 7/2007 | Neven |
| 2007/0174198 A1 | 7/2007 | Kasahara |
| 2007/0192723 A1 | 8/2007 | Anzelde et al. |
| 2007/0200335 A1 | 8/2007 | Tuschel |
| 2007/0205596 A1 | 9/2007 | Mizuno et al. |
| 2007/0206020 A1 | 9/2007 | Duffield et al. |
| 2007/0256118 A1 | 11/2007 | Nomura et al. |
| 2007/0288594 A1 | 12/2007 | Philyaw et al. |
| 2008/0022323 A1 | 1/2008 | Koo |
| 2008/0059998 A1 | 3/2008 | McClenny et al. |
| 2008/0062164 A1 | 3/2008 | Bassi et al. |
| 2008/0073434 A1 | 3/2008 | Epshteyn et al. |
| 2008/0077324 A1 | 3/2008 | Hatano et al. |
| 2008/0082684 A1 | 4/2008 | Gaos et al. |
| 2008/0092154 A1 | 4/2008 | Hogyoku |
| 2008/0112615 A1 | 5/2008 | Obrea et al. |
| 2008/0141321 A1* | 6/2008 | Kubat ............ H04N 21/23106 725/110 |
| 2008/0156879 A1 | 7/2008 | Melick et al. |
| 2008/0182561 A1 | 7/2008 | Kim et al. |
| 2008/0189185 A1 | 8/2008 | Matsuo et al. |
| 2008/0200153 A1 | 8/2008 | Fitzpatrick et al. |
| 2008/0200160 A1 | 8/2008 | Fitzpatrick et al. |
| 2008/0201078 A1 | 8/2008 | Fitzpatrick et al. |
| 2008/0244675 A1 | 10/2008 | Sako et al. |
| 2008/0263621 A1 | 10/2008 | Austerlitz et al. |
| 2008/0267537 A1 | 10/2008 | Thuries |
| 2008/0281624 A1 | 11/2008 | Shibata |
| 2008/0285944 A1 | 11/2008 | Tsunokawa |
| 2008/0288460 A1 | 11/2008 | Poniatowski et al. |
| 2008/0288600 A1 | 11/2008 | Clark |
| 2008/0307348 A1 | 12/2008 | Jones et al. |
| 2009/0029725 A1 | 1/2009 | Kindberg |
| 2009/0031071 A1 | 1/2009 | Chiu |
| 2009/0031373 A1 | 1/2009 | Hogyoku |
| 2009/0070699 A1 | 3/2009 | Birkill et al. |
| 2009/0083808 A1 | 3/2009 | Morrison |
| 2009/0088213 A1 | 4/2009 | Rofougaran |
| 2009/0094546 A1 | 4/2009 | Anzelde et al. |
| 2009/0108057 A1 | 4/2009 | Mu et al. |
| 2009/0113334 A1 | 4/2009 | Chakra et al. |
| 2009/0116074 A1 | 5/2009 | Wilsher |
| 2009/0154759 A1 | 6/2009 | Koskinen et al. |
| 2009/0157511 A1 | 6/2009 | Spinnell et al. |
| 2009/0157530 A1 | 6/2009 | Nagamoto et al. |
| 2009/0172780 A1 | 7/2009 | Sukeda et al. |
| 2009/0179852 A1 | 7/2009 | Refai et al. |
| 2009/0180025 A1 | 7/2009 | Dawson |
| 2009/0196456 A1 | 8/2009 | Bisti et al. |
| 2009/0200367 A1 | 8/2009 | Arnouse |
| 2009/0212112 A1 | 8/2009 | Li et al. |
| 2009/0212113 A1 | 8/2009 | Chiu et al. |
| 2009/0234570 A1 | 9/2009 | Sever |
| 2009/0250512 A1 | 10/2009 | Deck et al. |
| 2009/0254954 A1 | 10/2009 | Jeong |
| 2009/0293088 A1 | 11/2009 | Mukerji et al. |
| 2009/0293110 A1 | 11/2009 | Koga |
| 2009/0294538 A1 | 12/2009 | Wihlborg et al. |
| 2009/0300673 A1 | 12/2009 | Bachet et al. |
| 2009/0303036 A1 | 12/2009 | Sahuguet |
| 2009/0307232 A1 | 12/2009 | Hall |
| 2009/0307719 A1 | 12/2009 | Clark et al. |
| 2009/0312105 A1 | 12/2009 | Koplar |
| 2009/0320066 A1 | 12/2009 | Soldan et al. |
| 2010/0001072 A1 | 1/2010 | Onogi |
| 2010/0004984 A1 | 1/2010 | Beyabani |
| 2010/0017457 A1* | 1/2010 | Jumpertz ............ H04N 21/4325 709/202 |
| 2010/0020970 A1 | 1/2010 | Liu et al. |
| 2010/0026721 A1 | 2/2010 | Park et al. |
| 2010/0031162 A1 | 2/2010 | Wiser et al. |
| 2010/0036936 A1 | 2/2010 | Cox et al. |
| 2010/0053339 A1 | 3/2010 | Aaron et al. |
| 2010/0081375 A1 | 4/2010 | Rosenblatt et al. |
| 2010/0089996 A1 | 4/2010 | Koplar |
| 2010/0096448 A1 | 4/2010 | Melick et al. |
| 2010/0103018 A1 | 4/2010 | Yoon et al. |
| 2010/0114715 A1 | 5/2010 | Schuster et al. |
| 2010/0129057 A1 | 5/2010 | Kulkarni |
| 2010/0131373 A1 | 5/2010 | Kubasov |
| 2010/0131900 A1 | 5/2010 | Spetalnick |
| 2010/0131970 A1 | 5/2010 | Falcon |
| 2010/0131983 A1 | 5/2010 | Shannon et al. |
| 2010/0138344 A1 | 6/2010 | Wong |
| 2010/0149187 A1 | 6/2010 | Slavin et al. |
| 2010/0154035 A1 | 6/2010 | Damola et al. |
| 2010/0161437 A1 | 6/2010 | Pandey |
| 2010/0163613 A1 | 7/2010 | Bucher et al. |
| 2010/0169935 A1 | 7/2010 | Abbruzzese |
| 2010/0186025 A1 | 7/2010 | Thomas et al. |
| 2010/0188514 A1 | 7/2010 | Sato et al. |
| 2010/0201894 A1 | 8/2010 | Nakayama et al. |
| 2010/0205628 A1 | 8/2010 | Davis et al. |
| 2010/0217663 A1 | 8/2010 | Ramer et al. |
| 2010/0225653 A1 | 9/2010 | Sao et al. |
| 2010/0261454 A1 | 10/2010 | Shenfield et al. |
| 2010/0262924 A1 | 10/2010 | Kalu |
| 2010/0262992 A1 | 10/2010 | Casagrande |
| 2010/0272193 A1 | 10/2010 | Khan et al. |
| 2010/0272420 A1 | 10/2010 | Soohoo et al. |
| 2010/0275010 A1 | 10/2010 | Ghirardi |
| 2010/0279710 A1 | 11/2010 | Dicke et al. |
| 2010/0295868 A1 | 11/2010 | Zahnert et al. |
| 2010/0301115 A1 | 12/2010 | Berkun |
| 2010/0313231 A1 | 12/2010 | Okamoto et al. |
| 2010/0319041 A1 | 12/2010 | Ellis |
| 2010/0327060 A1 | 12/2010 | Moran et al. |
| 2011/0000958 A1 | 1/2011 | Herzig |
| 2011/0007630 A1 | 1/2011 | Almhana et al. |
| 2011/0030068 A1 | 2/2011 | Imai |
| 2011/0039573 A1 | 2/2011 | Hardie |
| 2011/0058516 A1 | 3/2011 | Small et al. |
| 2011/0061003 A1 | 3/2011 | Miyazawa et al. |
| 2011/0065451 A1 | 3/2011 | Danado et al. |
| 2011/0083154 A1 | 4/2011 | Boersma |
| 2011/0087539 A1 | 4/2011 | Rubinstein et al. |
| 2011/0107374 A1 | 5/2011 | Roberts et al. |
| 2011/0107386 A1 | 5/2011 | De Los Reyes et al. |
| 2011/0138408 A1 | 6/2011 | Adimatyam et al. |
| 2011/0208710 A1 | 8/2011 | Lesavich |
| 2011/0258058 A1 | 10/2011 | Carroll et al. |
| 2011/0264527 A1 | 10/2011 | Fitzpatrick et al. |
| 2011/0264530 A1 | 10/2011 | Santangelo et al. |
| 2011/0282727 A1 | 11/2011 | Phan et al. |
| 2011/0296046 A1 | 12/2011 | Arya et al. |

(56) References Cited

U.S. PATENT DOCUMENTS

| | | | |
|---|---|---|---|
| 2011/0314485 A1 | 12/2011 | Abed | |
| 2011/0321114 A1 | 12/2011 | Newell | |
| 2012/0075529 A1 | 3/2012 | Wong et al. | |
| 2012/0084206 A1 | 4/2012 | Mehew et al. | |
| 2012/0096499 A1 | 4/2012 | Dasher et al. | |
| 2012/0117193 A1* | 5/2012 | Phillips | H04N 21/2143 709/219 |
| 2012/0117232 A1 | 5/2012 | Brown et al. | |
| 2012/0127110 A1 | 5/2012 | Amm et al. | |
| 2012/0128267 A1 | 5/2012 | Dugan et al. | |
| 2012/0130835 A1 | 5/2012 | Fan et al. | |
| 2012/0130851 A1 | 5/2012 | Minnick et al. | |
| 2012/0131416 A1 | 5/2012 | Dugan et al. | |
| 2012/0137318 A1 | 5/2012 | Kilaru et al. | |
| 2012/0138671 A1 | 6/2012 | Gaede et al. | |
| 2012/0139826 A1 | 6/2012 | Beals et al. | |
| 2012/0139835 A1 | 6/2012 | Morrison et al. | |
| 2012/0142322 A1 | 6/2012 | Gomez | |
| 2012/0151293 A1 | 6/2012 | Beals | |
| 2012/0151524 A1 | 6/2012 | Kilaru et al. | |
| 2012/0153015 A1 | 6/2012 | Gomez et al. | |
| 2012/0153017 A1 | 6/2012 | Bracalente et al. | |
| 2012/0155838 A1 | 6/2012 | Gerhards et al. | |
| 2012/0158919 A1 | 6/2012 | Aggarwal et al. | |
| 2012/0159563 A1 | 6/2012 | Gomez et al. | |
| 2012/0168493 A1 | 7/2012 | Worms | |
| 2012/0168510 A1 | 7/2012 | Gratton | |
| 2012/0169928 A1 | 7/2012 | Casagrande et al. | |
| 2012/0175416 A1 | 7/2012 | Gomez et al. | |
| 2012/0181329 A1 | 7/2012 | Gratton et al. | |
| 2012/0182320 A1 | 7/2012 | Beals et al. | |
| 2012/0188112 A1 | 7/2012 | Beals et al. | |
| 2012/0188442 A1 | 7/2012 | Kennedy | |
| 2012/0198572 A1 | 8/2012 | Beals et al. | |
| 2012/0199643 A1 | 8/2012 | Minnick et al. | |
| 2012/0206648 A1 | 8/2012 | Casagrande et al. | |
| 2012/0215830 A1 | 8/2012 | Anguiano | |
| 2012/0217292 A1 | 8/2012 | Gratton et al. | |
| 2012/0217293 A1 | 8/2012 | Martch et al. | |
| 2012/0218470 A1 | 8/2012 | Schaefer | |
| 2012/0218471 A1 | 8/2012 | Gratton | |
| 2012/0222055 A1 | 8/2012 | Schaefer et al. | |
| 2012/0222071 A1 | 8/2012 | Gaede et al. | |
| 2012/0222081 A1 | 8/2012 | Schaefer et al. | |
| 2012/0293327 A1 | 11/2012 | Mountain | |
| 2012/0311623 A1 | 12/2012 | Davis et al. | |
| 2013/0068838 A1 | 3/2013 | Gomez et al. | |
| 2013/0239157 A1 | 9/2013 | Gaede et al. | |
| 2014/0046661 A1 | 2/2014 | Bruner | |
| 2014/0076963 A1 | 3/2014 | Gratton et al. | |
| 2014/0158762 A1 | 6/2014 | Gomez et al. | |
| 2016/0066050 A1 | 3/2016 | Gerhards et al. | |
| 2017/0366806 A1 | 12/2017 | Schaefer et al. | |
| 2018/0007415 A1 | 1/2018 | Kilaru et al. | |

FOREIGN PATENT DOCUMENTS

| | | |
|---|---|---|
| CN | 1352765 A | 6/2002 |
| CN | 1571503 A | 1/2005 |
| CN | 1636371 A | 7/2005 |
| CN | 1675930 A | 9/2005 |
| CN | 1839398 A | 9/2006 |
| CN | 101 227 581 A | 7/2008 |
| CN | 101253504 A | 8/2008 |
| CN | 101 355 685 A | 1/2009 |
| CN | 101 409 027 A | 4/2009 |
| CN | 101 873 467 A | 10/2010 |
| CN | 101 894 113 A | 11/2010 |
| CN | 101 895 722 A | 11/2010 |
| CN | 103221963 A | 7/2013 |
| DE | 23 36 711 A1 | 2/1975 |
| DE | 10 2007 038 810 A1 | 2/2009 |
| EP | 1 021 035 A1 | 7/2000 |
| EP | 1 383 071 A2 | 1/2004 |
| EP | 1 555 808 A1 | 7/2005 |
| EP | 1 724 695 A1 | 11/2006 |
| EP | 1 757 222 A1 | 2/2007 |
| EP | 1 768 400 A2 | 3/2007 |
| EP | 1 831 747 A1 | 9/2007 |
| EP | 2 079 051 A1 | 7/2009 |
| EP | 2 131 289 A1 | 12/2009 |
| EP | 2 439 936 A2 | 4/2012 |
| EP | 2 643 769 A1 | 10/2013 |
| EP | 2 643 793 A1 | 10/2013 |
| FR | 2 565 748 A1 | 12/1985 |
| FR | 2 929 467 A1 | 10/2009 |
| GB | 2 044 446 A | 10/1980 |
| GB | 2 165 129 A | 4/1986 |
| GB | 2 311 451 A | 9/1997 |
| GB | 2 325 765 A | 12/1998 |
| GB | 2 471 567 A | 1/2011 |
| IN | 4698/CHENP/2013 A | 6/2016 |
| IN | 7734/CHENP/2013 A | 6/2016 |
| JP | 2000-222116 A | 8/2000 |
| JP | 2002-215768 A | 8/2002 |
| JP | 3929450 | 6/2007 |
| JP | 2007-213548 A | 8/2007 |
| JP | 2008-244556 A | 10/2008 |
| JP | 2008-276716 | 11/2008 |
| JP | 2009-140204 A | 6/2009 |
| KR | 2004 0087776 A | 10/2004 |
| TW | 299433 | 3/1997 |
| TW | 200915193 A1 | 4/2009 |
| TW | 200926075 A | 6/2009 |
| TW | 201032139 A | 9/2010 |
| TW | 201038061 | 10/2010 |
| TW | 201043039 A1 | 12/2010 |
| WO | 95/27275 A1 | 10/1995 |
| WO | 97/41690 A1 | 11/1997 |
| WO | 01/06593 A2 | 1/2001 |
| WO | 01/18589 A1 | 3/2001 |
| WO | 01/58146 A2 | 8/2001 |
| WO | 2004/019442 A2 | 3/2004 |
| WO | 2005/109338 A1 | 11/2005 |
| WO | 2007/009005 A2 | 1/2007 |
| WO | 2009/056897 A1 | 5/2009 |
| WO | 2009/057651 A1 | 5/2009 |
| WO | 2009/116954 A2 | 9/2009 |
| WO | 2009/144536 A1 | 12/2009 |
| WO | 2010/149161 A1 | 12/2010 |
| WO | 2011/009055 A2 | 1/2011 |
| WO | 2012/071176 A1 | 5/2012 |
| WO | 2012071174 A1 | 5/2012 |

OTHER PUBLICATIONS

Jung, Eui-Hyun et al., "A Robust Digital Watermarking System Adopting 2D Barcode against Digital Piracy on P2P Network," IJCSNS International Journal of Computer Science and Network Security, vol. 6, No. 10, Oct. 2006, 6 pages.

"Android App Reviews & Showcase Just a Tapp Away," Android Tapp, 10pp. Found online at http://www.androidtapp.com/download-the-weather-channel-android-app-from-your-tv/, Oct. 22, 2010.

O'Sullivan, "Can Mobile Barcodes Work on TV?," India and Asia Pacific Mobile Industry Reports, Sep. 2009, 4 pp. Found online at http://gomonews.com/can-mobile-barcodes-work-on-tv/, Feb. 5, 2013.

"FOX TV Uses QR Codes," 2D Barcode Strategy, Sep. 2010, 6 pp. Found online at http://www.2dbarcodestrategy.com/2010/09/fox-tv-uses-qr-codes.html, Oct. 22, 2010.

"FOX's Fringe Uses QR Code," 2D Barcode Strategy, Oct. 2010, 4 pp. Found on the Internet at http://www.2dbarcodestrategy.com/2010/10/foxs-fringe-uses-qr-code.html, Oct. 22, 2010.

"Mobile Paths: QR Codes Come to TV," Mobile Behavior: An Omnicom Group Company, Sep. 2010, 8 pp. Found online at http://www.mobilebehavior.com/2010/09/27/mobile-paths-qr-codes-come-to-tv, Oct. 22, 2010.

"What Can I Do with the QR Barcode," Search Magnet Local—QR Barcode Technology, 2 pp. Found online at http://www.searchmagnetlocal.com/qr_barcode_technology.html, Oct. 22, 2010.

Byford, D., "Universal Interactive Device," International Business Machines Corporation, Jun. 1998, 1 page.

(56) References Cited

OTHER PUBLICATIONS

Costedio, K., "Bluefly QR Codes Debut on TV," 2 pp. Found online at http://www.barcode.com/Mobile-Barcode-news/bluefly-qr-codes-debut-on-tv.html, Oct. 22, 2010.
First Examination Report from European Patent Office dated May 18, 2015 for EP 11849496.2, 7 pages.
Examination Search Report from the European Patent Office dated Dec. 4, 2015 for EP 12707418.5, 8 pages.
Extended European Search Report for EP 12152690.9 dated Jun. 19, 2012, 9 pages.
European Office Action for EP 12716751.8 dated Nov. 11, 2015, 4 pages.
Extended European Search Report for EP 11842890.3 dated Mar. 26, 2014, 8 pages.
European Office Action for EP 11842890.3 dated Mar. 13, 2015, 8 pages.
European Office Action for EP 11842890.3 dated May 9, 2016, all pages.
Extended European Search Report for EP 11850819.1 dated Mar. 17, 2014, 5 pages.
Office Action for EP 11850819.1 dated Nov. 12, 2015, 4 pages.
Office Action for EP 12705768.5 dated May 25, 2016, all pages.
Extended European Search Report for EP 11846486 dated Mar. 26, 2014, 5 pages.
Extended European Search Report for EP 11852630 dated Jun. 30, 2014, 7 pages.
Office Action for Korean Patent Application No. 10-2013-7015610 dated Oct. 21, 2016, all pages.
Office Action for Korean Patent Application No. 10-2013-7015610 dated Feb. 21, 2017, all pages.
Office Action from European Patent Office for Application No. 11852630.0 dated May 12, 2015, 7 pages.
European Search Report for EP 11844504 dated Feb. 24, 2015, 10 pages.
European Search Report for EP 11855065 dated Mar. 6, 2014, 6 pages.
Notice of Allowance for Canadian Application 2,818,585 dated Apr. 3, 2017, 1 page.
Notice of Allowance for Canadian Application 2,828,463 dated Apr. 4, 2017, 1 page.
Office Action for CA 2,818,585 dated Nov. 28, 2016, all pages.
Office Action for EP 11811502.1 dated Aug. 29, 2016, all pages.
Office Action for EP 11855065 dated Mar. 13, 2015, 6 pages.
First Office Action by the Mexican Institute of Industrial Property for Mexican Patent Application No. MX/a/2013/009881 dated Aug. 14, 2014, 3 pages.
Notice of Allowance by the Mexican Institute of Industrial Property for Mexican Patent Application No. MX/a/2013/009881 dated Jan. 12, 2015, 1 page.
Publication of Brazil appln No. BR 11 2013 012218-8 on Aug. 9, 2016, 1 page.
Gao, J., et al., "A 2D Barcode-Based Mobile Payment System," Multimedia and Ubiquitous Engineering, 2009, 10 pp. Found online at http://ieeexplore.ieee.org/Xplore/login.jsp?url=http%3A%2F%2Fieeexplore.ieee.org%2Fie . . . , Oct. 22, 2010.
International Search Report and Written Opinion of PCT/US2011/059977 dated Mar. 19, 2012, 7 pages.
International Preliminary Report on Patentability of PCT/US2011/059977 dated Jun. 6, 2013, 6 pages.
International Preliminary Report on Patentability of PCT/US2012/048032 dated Apr. 3, 2014, 6 pages.
International Search Report and Written Opinion of PCT/US11/60002 dated Feb. 15, 2012, 7 pages.
International Preliminary Report on Patentability for PCT/US2011/060002 dated Jun. 6, 2013, 6 pages.
International Search Report and Written Opinion of PCT/US11/60094 dated Mar. 30, 2012, 7 pages.
International Preliminary Report on Patentability for PCT/US2011/060094 dated Jun. 20, 2013, 6 pages.
International Search Report and Written Opinion of PCT/US11/60104 dated Mar. 29, 2012, 9 pages.
International Search Report and Written Opinion of PCT/US2011/60121 dated Feb. 14, 2012, 7 pages.
International Preliminary Report on Patentability for PCT/US2011/060121 dated Jun. 20, 2013, 6 pages.
International Search Report and Written Opinion of PCT/US11/61074 dated Jan. 6, 2012, 11 pages.
International Search Report and Written Opinion of PCT/US11/61211 dated Mar. 29, 2012, 8 pages.
International Preliminary Report on Patentability for PCT/US2011/061211 dated Jul. 4, 2013, 7 pages.
International Search Report and Written Opinion of PCT/US11/61773 dated Feb. 21, 2012, 7 pages.
International Preliminary Report on Patentability for PCT/US2011/061773 dated Jun. 6, 2013, 6 pages.
International Search Report and Written Opinion of PCT/US11/61778 dated Mar. 2, 2012, 7 pages.
International Preliminary Report on Patentability for PCT/US2011/061778 dated Jul. 11, 2013, 6 pages.
International Search Report and Written Opinion of PCT/US11/63111 dated Apr. 4, 2012, 9 pages.
International Preliminary Report on Patentability of PCT/US2011/063111 dated Jun. 13, 2013, 8 pages.
International Search Report and Written Opinion of PCT/US2011/064709 dated Apr. 10, 2012, 8 pages.
International Search Report and Written Opinion of PCT/US2011/060098 dated Mar. 29, 2012, 10 pages.
International Preliminary Report on Patentability for PCT/US2011/060098 dated Jun. 13, 2013, 9 pages.
International Search Report and Written Opinion of PCT/US2011/063308 dated Mar. 29, 2012, 10 pages.
International Preliminary Report on Patentability for PCT/US2011/063308 dated Jul. 18, 2013, 9 pages.
International Search Report and Written Opinion of PCT/US2011/068161 dated Jun. 14, 2012, 19 pages.
International Preliminary Report on Patentability for PCT/US2011/068161 dated Jul. 25, 2013, 13 pages.
International Search Report and Written Opinion of PCT/US2011/068176 dated Mar. 29, 2012, 15 pages.
International Search Report and Written Opinion of PCT/US2012/021657 dated May 23, 2012, 12 pages.
International Search Report of PCT/US2012/022581 dated Oct. 8, 2012, 18 pages.
International Preliminary Report on Patentability for PCT/US2012/022581 dated Aug. 8, 2013, 12 pages.
International Search Report and Written Opinion of PCT/US2012/022405 dated Apr. 19, 2012, 11 pages.
International Preliminary Report on Patentability for PCT/US2012/022405 dated Aug. 8, 2013, 7 pages.
International Search Report and Written Opinion of PCT/US2012/024923 dated May 22, 2012, 12 pages.
International Preliminary Report on Patentability for PCT/US2012/024923 dated Aug. 29, 2013, 8 pages.
International Search Report and Written Opinion of PCT/US2012/024956 dated Jun. 11, 2012, 10 pages.
International Preliminary Report on Patentability for PCT/US2012/024956 dated Aug. 29, 2013, 7 pages.
International Search Report and Written Opinion of PCT/US2012/025502 dated Jun. 8, 2012, 13 pages.
International Preliminary Report on Patentability for PCT/US2012/025502 dated Sep. 6, 2013, 9 pages.
International Search Report and Written Opinion of PCT/US2012/025607 dated Jun. 8, 2012, 13 pages.
International Preliminary Report on Patentability for PCT/US2012/025607 dated Sep. 12, 2013, 8 pages.
International Search Report and Written Opinion of PCT/US2012/025634 dated May 7, 2012, 8 pages.
International Preliminary Report on Patentability for PCT/US2012/025634 dated Sep. 6, 2013, 5 pages.
International Search Report and Written Opinion of PCT/US2012/026373 dated Jun. 13, 2012, 14 pages.

(56) References Cited

OTHER PUBLICATIONS

International Preliminary Report on Patentability for PCT/US2012/026373 dated Sep. 12, 2013, 10 pages.
International Search Report and Written Opinion of PCT/US2012/026624 dated Aug. 29, 2012, 14 pages.
International Preliminary Report on Patentability for PCT/US2012/026624 dated Sep. 12, 2013, 12 pages.
International Search Report and Written Opinion of PCT/US2012/026722 dated Jun. 28, 2012, 11 pages.
International Search Report and Written Opinion of PCT/US2012/048032 dated Oct. 16, 2012, 14 pages.
International Search Report and Written Opinion of PCT/US2011/060109 dated Feb. 14, 2012, 7 pages.
International Preliminary Report on Patentability for PCT/US2011/060109 dated Jun. 20, 2013, 7 pages.
First Examination Report from European Patent Office dated Feb. 4, 2015 for EP 12716751.8, 4 pages.
First Office Action for CN 201180065044.7 dated Feb. 13, 2015 by the State Intellectual Property Office (SIPO), 4 pages.
First Office Action with Search Report for CN 201280013891.3 dated Jan. 15, 2016, 13 pages.
Second Office Action CN 201280013891.3 dated Aug. 12, 2016, all pages.
Second Office Action for CN 201180065044.7 dated Sep. 9, 2015 by the State Intellectual Property Office (SIPO), 23 pages.
Office Action from European Patent Office for Application No. 12716728.6 dated Feb. 26, 2015, 5 pages.
Notice of Allowance and search report for ROC (Taiwan) Patent Application No. 101106288, 9 pages.
Office Action of the Intellectual Property Office for ROC Patent App. No. 101101486 dated Aug. 5, 2014, 4 pages.
Office Action of the Intellectual Property Office for ROC Patent App. No. 100143194 dated Sep. 23, 2014, 10 pages.
Office Action of the Intellectual Property Office for ROC Patent App. No. 100142978 dated Sep. 23, 2014, 9 pages.
Office Action from State Intellectual Property Office for CN Appln. No. 201180056242.7, 10 pages.
Second Office Action from State Intellectual Property Office for CN Appln. No. 201180056242.7 dated Jan. 26, 2016, all pages.
Third Office Action from State Intellectual Property Office for CN Appln. No. 201180056242.7 dated Jul. 28, 2016, all pages.
First Office Action and Search Report from State Intellectual Property Office for CN Appln. No. 201180064527.5 dated Oct. 23, 2015, 10 pages.
Second Office Action from State Intellectual Property Office for CN Appln. No. 201180064527.5 dated Jun. 12, 2016, all pages.
(Translation) Rejection Decision for CN Appln. No. 201180064527.5 dated Oct. 9, 2016, all pages.
The First Office Action dated Sep. 11, 2014 for Mexican Patent Application No. MX/a/2013/007672 is not translated into English, 2 pages.
The Second Office Action dated Jun. 1, 2015 for Mexican Patent Application No. MX/a/2013/007672 is not translated into English, 2 pages.
Office Action dated Mar. 2, 2017 for KR 10-2013-7020865, all pages.
Notice to Grant for KR 10-2013-7020865, all pages.
Notice of Allowance dated Nov. 10, 2015 for Mexican Patent Application No. MX/a/2013/007672, 1 page.
The First Office Action dated Jul. 13, 2015 for Mexican Patent Application No. MX/a/2013/009791 is not translated into English, 2 pages.
Notice of Allowance for Mexican Patent Application No. MX/a/2013/009791 dated Mar. 15, 2016, 1 page.
Office Action dated Nov. 12, 2014 for Mexican Patent Application No. MX/a/2013/009794, 2 pages.
Office Action dated Oct. 17, 2016 for European Patent Appln. No. 12701638.4, all pages.
Notice of Allowance dated Feb. 18, 2015 for Mexican Patent Application No. MX/a/2013/009794, 1 page.

The First Office Action for Mexican Patent Application No. MX/a/2013/006262 is not translated into English. This document is from prosecution of the corresponding foreign matter for which we do not have a translation. Dated Aug. 7, 2014, 2 pages.
Office Action dated Feb. 10, 2015 for Mexican Patent Application No. MX/a/2013/006770, 2 pages.
Office Action dated Feb. 6, 2015 for Mexican Patent Application No. MX/a/2013/006520, 2 pages.
Office Action dated Jan. 28, 2015 for Mexican Patent Application No. MX/a/2013/006973, 9 pages.
Notice of Allowance for Mexican Patent Application No. MX/a/2013/006973 dated Sep. 4, 2015, 1 page.
Office Action dated Dec. 5, 2014 for Mexican Patent Application No. MX/a/2013/009882, 2 pages.
Office Action for European Patent App. 12704473.3 dated Apr. 29, 2016, all pages.
The Second Office Action dated Apr. 22, 2015 for Mexican Patent Application No. MX/a/2013/009883, 2 pages.
Supplementary European Search Report for EP 11843423 completed Mar. 23, 2016, 8 pages.
Supplementary European Search Report for EP 11843045) completed Mar. 31, 2016, all pages.
Kato et al, "2D barcodes for mobile phones", Mobile Technology, Applications and Systems, 2005 2nd International Conference on Guangzhou, China Nov. 15-17, 2005, Piscataway, NJ, USA, IEEE, Piscataway, NJ, USA, Nov. 15, 2005, pp. 8pp-8, XP031887368, DOI: 10.1109/MTAS.2005.207166; ISBN: 978-981-05-4573-4, 8 pages.
Liu, Yue et al., "Recognition of QR code with mobile phones," Control and Decision Conference, 2008. CCDC 2008. Jul. 2-4, 2008, pp. 203, 206.
Ngee, S., "Data Transmission Between PDA and PC Using WiFi for Pocket Barcode Application," Thesis, University Teknologi Malaysia, May 2007, 126 pp. Found online at http://eprints.utm.my/6421/1/SeahYeowNgeeMFKE20007TTT.pdf, Oct. 22, 2010.
Olson, E., "Bar Codes add Detail on Items in TV Ads," New York Times, Sep. 2010, 3 pp. Found online at http:www.nytimes.com/2010/09/27/business/media/27bluefly.html?src=busin, Oct. 22, 2010.
Publication of BR 11 2014 020007-6 A2 on Jun. 20, 2017, 1 page.
Publication of PCT/US2011/059977 by the India Controller General of Patents Designs and Trademarks as India Patent Publication No. 4694/CHENP/2013 A on Sep. 5, 2014, 1 page.
Publication of PCT/US2012/025634 by the India General Patents Designs and Trademarks as India Patent Publication No. 6967/CHENP/2013 A on Aug. 1, 2014, 1 page.
Rekimoto, J., et al., "Augment-able Reality: Situated Communication Through Physical and Digital Spaces," Sony Computer Science Laboratory, 2002, 8 pp. Found online at Citeseer: 10.1.1.20.34[1].pdf, Oct. 22, 2010.
Schmitz, A., et al., "Ad-Hoc Multi-Displays for Mobile Interactive Applications," 31st Annual Conference of the European Association for Computer Graphics (Eurographics 2010), May 2010, vol. 29, No. 2, 8 pages.
Silverstein, B., "QR Codes and TV Campaigns Connect," ReveNews, Sep. 2010, 5 pp. Found online at http://www.revenews.com/barrysilverstein/qr-codes-and-tv-campaigns-connect/, Oct. 22, 2010.
Smith, L., "QR Barcodes Make History on Global TV," 3 pp. Found online at http://lindsaysmith.com/worlds-first-mobio-mini-telethon/, Oct. 22, 2010.
Yamanari, T., et al., "Electronic Invisible Code Display Unit for Group Work on Reminiscence Therapy," Proceedings of the International MultiConference of Engineers and Computer Scientists 2009, vol. 1, IMECS 2009, Mar. 2009, 6 pp. Retrieved from the Internet: http://citeseerx.ist.psu.edu/viewdoc/download?doi=10.1.1.145.6904&rep1&type=pdf.
Yang, C., et al., "Embedded Digital Information Integrated by Video-on-Demand System," Proceedings of the Fourth International Conference on Networked Computing and Advanced Information Management, IEEE Computer Society, 2008, 6 pages.
First Office Action including Search Report from the State Intellectual Property Office for CN Patent Appln. No. 201280014034.5 dated Apr. 5, 2016, all pages.

(56) References Cited

OTHER PUBLICATIONS

First Office Action and Search Report from the State Intellectual Property Office (SIPO) for CN 201180056249.9 dated Feb. 3, 2016, all pages.
Notice of Decision to Grant for KR 10-2013-7024307 dated Apr. 14, 2017, 2 pages.
Second Office Action issued by State Intellectual Property Office (SIPO) for CN 201180056249.9 dated Feb. 4, 2017, all pages.
Office Action and Search Report from the State Intellectual Property Office for CN Pat. Appln. No. 201180066584.7 dated Jul. 10, 2015, 12 pages.
Second Office Action issued by State Intellectual Property Office for CN Pat. Appln. No. 201180066584.7 dated Jan. 11, 2016, 5 pages.
Office Action and Search Report for ROC (Taiwan) Patent Application No. 10014870 dated May 7, 2014, issued in the corresponding foreign application, 9 pages.
Office Action for Korean Patent Application No. 10-2013-7020207 dated Dec. 21, 2016, all pages.
Decision to Grant for Korean Patent Application No. 10-2013-7020207 dated Mar. 9, 2017, all pages.
Office Action and Search Report for ROC (Taiwan) Patent Application No. 100149344 dated Jan. 23, 2015, 8 pages.
Search Report for Patent Application ROC (Taiwan) Patent Application No. 100149344 dated Oct. 28, 2015, 1 page.
Office Action and Search Report for ROC (Taiwan) Pat. Appln. No. 101106313, all pages.
Office Action and Search Report for ROC (Taiwan) Patent Application No. 100142966 dated May 27, 2014, 6 pages.
Office Action for European Patent Application No. 12707435.9 dated Mar. 12, 2015, 6 pages.
Office Action for European Patent Application No. 12719817.4 dated Jun. 23, 2014 issued in the corresponding foreign application, 5 pages.
First Office Action for CN 201280010873 dated Mar. 2, 2016, all pages.
Notice of Decision to Grant for CN 201280010873 dated Mar. 25, 2016, all pages. (not in English).
Notice of Allowance for Canadian Application 2,822,214 dated Nov. 28, 2016, 1 page.
U.S. Appl. No. 14/179,336, filed Feb. 12, 2014, Non-Final Office Action dated May 22, 2014, 14 pages.
U.S. Appl. No. 14/179,336, filed Feb. 12, 2014 Final Office Action dated Dec. 1, 2014, 30 pages.
U.S. Appl. No. 14/179,336, filed Feb. 12, 2014 Notice of Allowance dated Feb. 18, 2015, 15 pages.
U.S. Appl. No. 13/302,717, filed Nov. 22, 2011 Non Final Rejection dated Jun. 16, 2016, all pages.
U.S. Appl. No. 13/302,717, filed Nov. 22, 2011 Non Final Rejection dated Dec. 2, 2015, 27 pages.
U.S. Appl. No. 13/302,717, filed Nov. 22, 2011 Final Rejection dated May 8, 2015, 44 pages.
U.S. Appl. No. 13/302,717, filed Nov. 22, 2011 Non-Final Rejection dated Dec. 18, 2014, 71 pages.
U.S. Appl. No. 12/958,073, filed Dec. 1, 2010, Office Action dated Aug. 31, 2012, 12 pages.
U.S. Appl. No. 12/958,073, filed Dec. 1, 2010, Notice of Allowance dated Jan. 17, 2013, 17 pages.
U.S. Appl. No. 12/961,369, filed Dec. 6, 2010, Non-Final Office Action dated Mar. 9, 2012, 17 pages.
U.S. Appl. No. 12/964,478, filed Dec. 9, 2010, Non-Final Office Action dated Mar. 26, 2013, 19 pages.
U.S. Appl. No. 12/964,478, filed Dec. 9, 2010, Final Office Action dated Sep. 16, 2013, 12 pages.
U.S. Appl. No. 12/971,349, filed Dec. 17, 2010, Office Action dated Nov. 10, 2011, 9 pages.
U.S. Appl. No. 12/971,349, filed Dec. 17, 2010, Final Office Action dated Jan. 20, 2012, 10 pages.
U.S. Appl. No. 12/961,369, filed Dec. 6, 2010, Notice of Allowance dated Jul. 16, 2014, 15 pages.
U.S. Appl. No. 12/961,369, filed Dec. 6, 2010, Final Rejection dated Oct. 30, 2012, 17 pages.
U.S. Appl. No. 12/961,369, filed Dec. 6, 2010, Non-Final Office Action dated Mar. 25, 2013, 17 pages.
U.S. Appl. No. 12/961,369, filed Dec. 6, 2010, Non-Final Office Action dated Jul. 12, 2013, 22 pages.
U.S. Appl. No. 12/961,369, filed Dec. 6, 2010, Non-Final Office Action dated Feb. 13, 2014, 21 pages.
U.S. Appl. No. 12/971,349, filed Dec. 7, 2010, Notice of Allowance dated Oct. 2, 2013, 24 pages.
U.S. Appl. No. 12/971,349, filed Dec. 7, 2010, Final Rejection dated Oct. 24, 2012, 11 pages.
U.S. Appl. No. 12/971,349, filed Dec. 17, 2010, Office Action dated Jul. 16, 2012, 11 pages.
U.S. Appl. No. 12/981,244, filed Dec. 29, 2010, Office Action dated Dec. 21, 2012, 23 pages.
U.S. Appl. No. 12/981,244, filed Dec. 29, 2010, Final Office Action dated Oct. 30, 2013, 10 pages.
U.S. Appl. No. 12/981,244, filed Dec. 29, 2010, Notice of Allowance dated Mar. 25, 2014, 17 pages.
U.S. Appl. No. 12/984,385, filed Jan. 4, 2011, Notice of Allowance dated Nov. 28, 2012, 11 pages.
U.S. Appl. No. 12/984,385, filed Jan. 4, 2011, Office Action dated Jul. 12, 2012, 16 pages.
U.S. Appl. No. 12/986,721, filed Jan. 7, 2011, Office Action dated Mar. 16, 2012, 6 pages.
U.S. Appl. No. 12/986,721, filed Jan. 7, 2011, Notice of Allowance dated Jun. 21, 2012, 7 pages.
U.S. Appl. No. 12/953,227, filed Nov. 23, 2010, Final Office Action dated May 24, 2013, 17 pages.
U.S. Appl. No. 12/953,227, filed Nov. 23, 2010, Office Action dated Oct. 7, 2012, 31 pages.
U.S. Appl. No. 12/953,227, filed Nov. 23, 2010, Non Final Office action dated Mar. 24, 2015, 39 pages.
U.S. Appl. No. 12/953,227, filed Nov. 23, 2010, Final Office Action dated Nov. 6, 2015, 26 pages.
U.S. Appl. No. 12/953,227, filed Nov. 23, 2010, Notice of Allowance dated May 9, 2017, all pages.
U.S. Appl. No. 13/015,382, filed Jan. 27, 2011, Office Action dated Nov. 13, 2012, 7 pages.
U.S. Appl. No. 13/015,382, filed Jan. 27, 2011, Notice of Allowance dated Feb. 22, 2013, 12 pages.
U.S. Appl. No. 13/016,483, filed Jan. 28, 2011 Office Action dated Nov. 2, 2012, 18 pages.
U.S. Appl. No. 13/016,483, filed Jan. 28, 2011 Final Office Action dated Jun. 27, 2013, 13 pages.
U.S. Appl. No. 13/016,483, filed Jan. 28, 2011 Non-Final Office Action dated Nov. 3, 2014, 33 pages.
U.S. Appl. No. 13/016,483, filed Jan. 28, 2011 Final Office Action dated May 13, 2015, 34 pages.
U.S. Appl. No. 13/016,483, filed Jan. 28, 2011 Non-Final Office Action dated Dec. 14, 2015, 27 pages.
U.S. Appl. No. 13/016,483, filed Jan. 28, 2011 Final Office Action dated Jul. 5, 2016, all pages.
U.S. Appl. No. 13/035,474, filed Feb. 25, 2011 Non Final Rejection dated Feb. 17, 2015, 57 pages.
U.S. Appl. No. 12/953,273, filed Nov. 23, 2010, Notice of Allowance, dated Oct. 18, 2012, 11 pages.
U.S. Appl. No. 12/965,645, filed Dec. 10, 2010, Non-Final Office Action, dated Jul. 19, 2013, 20 pages.
U.S. Appl. No. 12/965,645, filed Dec. 10, 2010, Final Office Action, dated Mar. 18, 2014, 24 pages.
U.S. Appl. No. 12/965,645, filed Dec. 10, 2010, Notice of Allowance, dated Jun. 20, 2014, 35 pages.
U.S. Appl. No. 12/973,431, filed Dec. 20, 2010, Non-Final Rejection dated May 15, 2013, 30 pages.
U.S. Appl. No. 12/973,431, filed Dec. 20, 2010, Final Office Action dated Aug. 27, 2013, 11 pages.
U.S. Appl. No. 12/973,431, filed Dec. 20, 2010 Non-Final Rejection dated Dec. 19, 2014, 30 pages.
U.S. Appl. No. 12/973,431, filed Dec. 20, 2010 Notice of Allowance dated May 28, 2015, 20 pages.

(56) References Cited

OTHER PUBLICATIONS

U.S. Appl. No. 13/007,317, filed Jan. 14, 2011, Office action dated Dec. 19, 2012, 29 pages.
U.S. Appl. No. 13/010,557, filed Jan. 20, 2011, Final Rejection dated Jan. 16, 2014, 17 pages.
U.S. Appl. No. 13/010,557, filed Jan. 20, 2011, Non-Final Rejection dated Aug. 5, 2013, 17 pages.
U.S. Appl. No. 13/014,591, Notice of Allowance dated May 24, 2013, 32 pages.
U.S. Appl. No. 13/020,678, filed Feb. 3, 2011, Office Action dated Jul. 30, 2012, 15 pages.
U.S. Appl. No. 13/020,678, filed Feb. 3, 2011, Notice of Allowance dated Jan. 3, 2013, 13 pages.
U.S. Appl. No. 13/007,317, Notice of Allowance dated May 13, 2013, 16 pages.
U.S. Appl. No. 13/028,030, filed Feb. 15, 2011, Office Action dated Jan. 11, 2013, 14 pages.
U.S. Appl. No. 13/028,030, filed Feb. 15, 2011, Final Office Action dated Jul. 11, 2014, 43 pages.
U.S. Appl. No. 13/028,030, filed Feb. 15, 2011, Non-Final Office Action dated Feb. 6, 2015, 56 pages.
U.S. Appl. No. 13/028,030, filed Feb. 15, 2011, Final Office Action dated Jul. 17, 2015, 63 pages.
U.S. Appl. No. 13/031,115, Notice of Allowance dated Apr. 16, 2013, 24 pages.
U.S. Appl. No. 13/034,482, filed Feb. 24, 2011 Notice of Allowance dated Aug. 29, 2014, 45 pages.
U.S. Appl. No. 13/034,482, filed Feb. 24, 2011, Final Office Action dated Apr. 25, 2013, 19 pages.
U.S. Appl. No. 13/034,482, filed Feb. 24, 2011, Office Action dated Oct. 19, 2012, 11 pages.
U.S. Appl. No. 13/035,474, filed Feb. 25, 2011, Office Action dated Oct. 30, 2012, 11 pages.
U.S. Appl. No. 13/035,474, filed Feb. 25, 2011, Final Rejection dated Mar. 29, 2013, 20 pages.
U.S. Appl. No. 13/035,474, filed Feb. 25, 2011, Non Final Rejection dated Mar. 6, 2014, 20 pages.
U.S. Appl. No. 13/035,474, filed Feb. 25, 2011 Final Rejection dated Aug. 27, 2014, 38 pages.
U.S. Appl. No. 13/035,474, filed Feb. 25, 2011 Non Final Rejection dated Sep. 11, 2015, 65 pages.
U.S. Appl. No. 12/960,285, filed Dec. 3, 2010 Non-Final Office Action dated May 14, 2015, 21 pages.
U.S. Appl. No. 12/960,285, filed Dec. 3, 2010 Final Office Action dated Dec. 3, 2014, 19 pages.
U.S. Appl. No. 12/960,285, filed Dec. 3, 2010, Non-Final Office Action dated Jun. 6, 2014, 19 pages.
U.S. Appl. No. 12/960,285, filed Dec. 3, 2010, Final Office Action dated Apr. 18, 2013, 14 pages.
U.S. Appl. No. 12/960,285, filed Dec. 3, 2010, Non-Final Office Action dated Dec. 6, 2012, 17 pages.
U.S. Appl. No. 12/960,285, filed Dec. 3, 2010, Notice of Allowance dated Nov. 18, 2015, 31 pages.
U.S. Appl. No. 13/006,270, filed Jan. 13, 2011, Non-Final Office Action dated Oct. 8, 2013, 20 pages.
U.S. Appl. No. 13/006,270, filed Jan. 13, 2011, Final Office Action dated May 9, 2014, 41 pages.
U.S. Appl. No. 13/006,270, filed Jan. 13, 2011 Non-Final Office Action dated Sep. 12, 2014, 41 pages.
U.S. Appl. No. 13/006,270, filed Jan. 13, 2011, Final Office Action dated Mar. 23, 2014, 51 pages.
U.S. Appl. No. 13/028,030, filed Feb. 15, 2011 Non-Final Office Action dated Dec. 17, 2013, 60 pages.
U.S. Appl. No. 13/035,525, filed Feb. 25, 2011, Office Action dated Jul. 18, 2012, 15 pages.
U.S. Appl. No. 13/035,525, filed Feb. 25, 2011, Final Office Action dated Jan. 31, 2013, 26 pages.
U.S. Appl. No. 13/035,525, filed Feb. 25, 2011, Non-Final Office Action dated May 15, 2013, 15 pages.
U.S. Appl. No. 13/035,525, filed Feb. 25, 2011, Final Office Action dated Sep. 12, 2013, 21 pages.
U.S. Appl. No. 13/037,302, filed Feb. 28, 2011, Office Action dated Mar. 1, 2013, 20 pages.
U.S. Appl. No. 13/037,302, filed Feb. 28, 2011, Final Office Action dated Oct. 16, 2013, 28 pages.
U.S. Appl. No. 13/037,302, filed Feb. 28, 2011, Final Office Action dated May 4, 2015, 54 pages.
U.S. Appl. No. 13/037,302, filed Feb. 28, 2011, Non-Final Office Action dated Jan. 12, 2016, 62 pages.
U.S. Appl. No. 13/037,302, filed Feb. 28, 2011, Final Office Action dated Jul. 12, 2016, all pages.
U.S. Appl. No. 13/037,302, filed Feb. 28, 2011, Notice of Allowance dated Feb. 16, 2017, all pages.
U.S. Appl. No. 13/037,312, filed Feb. 28, 2011, Office Action dated Aug. 15, 2012, 9 pages.
U.S. Appl. No. 13/037,312, filed Feb. 28, 2011, Notice of Allowance dated Jun. 13, 2013, 10 pages.
U.S. Appl. No. 13/037,312, filed Feb. 28, 2011, Final Office Action dated Feb. 28, 2013, 18 pages.
U.S. Appl. No. 13/037,316, filed Feb. 28, 2011, Office Action dated Jan. 30, 2013, 21 pages.
U.S. Appl. No. 13/037,316, filed Feb. 28, 2011, Final Office Action dated Aug. 28, 2013, 13 pages.
U.S. Appl. No. 13/037,333, filed Feb. 28, 2011, Notice of Allowance dated Jan. 18, 2013, 27 pages.
U.S. Appl. No. 13/192,287, filed Jul. 27, 2011, Notice of Allowance dated Dec. 14, 2015, 14 pages.
U.S. Appl. No. 13/192,287, filed Jul. 27, 2011, Final Office Action dated Jan. 28, 2014, 18 pages.
U.S. Appl. No. 13/192,287, filed Jul. 27, 2011, Non Final Office Action dated Jun. 13, 2013, 22 pages.
U.S. Appl. No. 13/673,480, filed Nov. 9, 2012, Office Action dated Jan. 16, 2013, 27 pages.
U.S. Appl. No. 13/673,480, filed Nov. 9, 2012 Final Office Action dated Sep. 9, 2013, 10 pages.
U.S. Appl. No. 13/673,480, filed Nov. 9, 2012 Notice of Allowance dated Nov. 12, 2013, 16 pages.
U.S. Appl. No. 13/475,794, filed May 18, 2012 Non-Final Office Action dated Sep. 18, 2013, 19 pages.
U.S. Appl. No. 13/475,794, filed May 18, 2012 Non-Final Office Action dated Nov. 21, 2014, 33 pages.
U.S. Appl. No. 13/475,794, filed May 18, 2012 Final Office Action dated Jun. 1, 2015, 45 pages.
U.S. Appl. No. 13/475,794, filed May 18, 2012 Non Final Office Action dated Jul. 29, 2016, all pages.
U.S. Appl. No. 13/475,794, filed May 18, 2012 Notice of Allowance dated Jan. 5, 2017, all pages.
U.S. Appl. No. 13/864,474, filed Apr. 17, 2013 Non Final Office Action dated Aug. 11, 2015, 59 pages.
U.S. Appl. No. 13/864,474, filed Apr. 17, 2013 Final Office Action dated Nov. 20, 2015, all pages.
U.S. Appl. No. 13/864,474, filed Apr. 17, 2013 Non Final Office Action dated Mar. 23, 2016, all pages.
U.S. Appl. No. 13/864,474, filed Apr. 17, 2013 Notice of Allowance dated Feb. 16, 2017, all pages.
U.S. Appl. No. 13/968,611, filed Aug. 16, 2013, Notice of Allowance dated May 2, 2014, 40 pages.
U.S. Appl. No. 13/968,611, filed Aug. 16, 2013, Non-Final Office Action dated Jan. 17, 2014, 21 pages.
U.S. Appl. No. 14/852,787, filed Sep. 14, 2015, Non-Final Office Action dated Sep. 14, 2016, all pages.
U.S. Appl. No. 14/852,787, filed Sep. 14, 2015, Final Office Action dated Jan. 13, 2017, all pages.
Third Office Action from State Intellectual Property Office for CN Appln. No. CN 201280013891.3 dated Dec. 30, 2016, all pages.
Office Action for CA 2,818,757 dated Jul. 12, 2017, all pages.
Office Action for CA 2,818,604, all pages.
Third Office Action issued by State Intellectual Property Office (SIPO) for CN 201180056249.9 dated Aug. 21, 2017, all pages.
U.S. Appl. No. 14/852,787, filed Sep. 14, 2015, Non-Final Office Action dated Sep. 3, 2017, all pages.
Office Action for CA 2,823,636 dated Jan. 24, 2017, all pages.

(56) References Cited

OTHER PUBLICATIONS

Office Action for CA 2,825,414 dated Apr. 3, 2017, all pages.
Office Action for CA 2,825,414 dated Nov. 1, 2017, all pages.
First Examination Report for EP Appln No. 12716110.7 dated Aug. 2, 2017, all pages.
First Office Action for CA Appln No. 2828447 dated Sep. 7, 2017, all pages.
U.S. Appl. No. 14/852,787, filed Sep. 14, 2015, Notice of Allowance dated Feb. 21, 2018, all pages.
U.S. Appl. No. 15/639,871, filed Jun. 30, 2017, Notice of Allowance dated Mar. 5, 2018, all pages.

* cited by examiner

FACILITATING PLACESHIFTING USING MATRIX CODES

CROSS-REFERENCES TO RELATED APPLICATIONS

This application is a continuation of U.S. patent application Ser. No. 13/864,474 filed on Apr. 17, 2013, which is a continuation of U.S. patent application Ser. No. 13/037,333 filed on Feb. 28, 2011. The contents of the above applications are hereby incorporated by reference in their entireties for all purposes.

FIELD OF THE INVENTION

The present disclosure relates to systems and methods for facilitating placeshifting transmissions and more particularly to systems and method for facilitating placeshifting transmissions to users of a target device using matrix code.

SUMMARY

In one embodiment, the present disclosure relates to a method for providing a user of a target device with place-shifted content. The method includes detecting, utilizing the target device, a matrix code. The matrix code is associated with an audio/visual program. Data encoded in the matrix code includes program identifying information and elapsed time information with respect to the program. The method further includes generating, utilizing the target device, a request for the program based at least in part on the encoded data. The method also includes transmitting, utilizing the target device, the program request across a network.

In one embodiment, the present disclosure relates to a system for transmitting placeshifted content. The system includes a content receiver, a target device, and a placeshifting device. The content receiver includes a first processing unit provided with computer implemented instructions to: receive a content stream from a service provider and transmit the content stream to a presentation device for display to a user; generate, based at least in part on the content stream and/or data associated with the content stream, a matrix code; and transmit the matrix code to the presentation device for display to the user. The target device is communicably coupled to a network and includes an optical input device configured to optically detect the matrix code, and a second processing unit communicably coupled to the optical input device. The second processing unit is provided with computer implemented instructions to: decode the matrix code; and generate, based at least in part on the decoded matrix code, a request for a content stream previously transmitted from the service provider to the content receiver. The placeshifting device is communicably coupled to the network and includes a third processing unit. The third processing unit is provided with computer implemented instructions to: receive across the network the target device's request for a content stream; and based at least in part on the request, retrieve from a storage device a content stream for transmission over the network to the target device.

In one embodiment, the present disclosure relates to a target device in a placeshifting system. The target device includes a network connection, an optical input device configured to optically detect a matrix code; and a processing unit connected to the network connection and configured to send and receive transactions across a network though the network connection. The processing unit is communicably coupled to the optical input device and is provided with computer implemented instructions to: decode the matrix code; generate, based at least in part on the decoded matrix code, a request for a content stream corresponding to the program; and process the content stream corresponding to the program received from across the network from a placeshifting source. The matrix code comprises at least program identifying information and elapsed time information with respect to the program.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

The present disclosure relates to systems and methods for facilitating placeshifting transmissions and more particularly to systems and method for facilitating placeshifting transmissions to users of a target device using matrix code.

Placeshifting technology is generally available today that allows a user to view content on a target device that would otherwise only be available at a placeshifting source, such as a receiver. Through placeshifting technology that is integrated into the receiver or is implemented in a stand-alone device, content can be shifted across a network to be viewed on a target device that is located remotely from the receiver. The shifted content may include programs or other content that is received at the receiver from a service provider, such as a satellite or cable television provider. The receiver may also shift recorded programs across the network to be viewed at the target device.

Often times, users viewing a particular program or other audio/visual content may be interrupted or otherwise required to leave the program prior to its completion. In such circumstances, users having access to placeshifting and recording technology can access, from a remote location, the partially viewed programs across the network for viewing at a target device. However, employing current placeshifting and recording technologies, to carry out such an operation, users must first program the receiver to record the program, and subsequently, from the remote location, enter a series of commands via a user interface of the target device to select the desired program. Moreover, to view the program at the target device from the point where the user concluded his partial viewing, users are required to enter a series of additional commands via the user interface (e.g., fast forward/backward). The present disclosure relates to systems and methods that utilize matrix codes to provide users having access to placeshifting and recording technology with convenient access to partially viewed programs or other audio/visual content at the point in the program that the user concluded his partial viewing.

Figure 1:
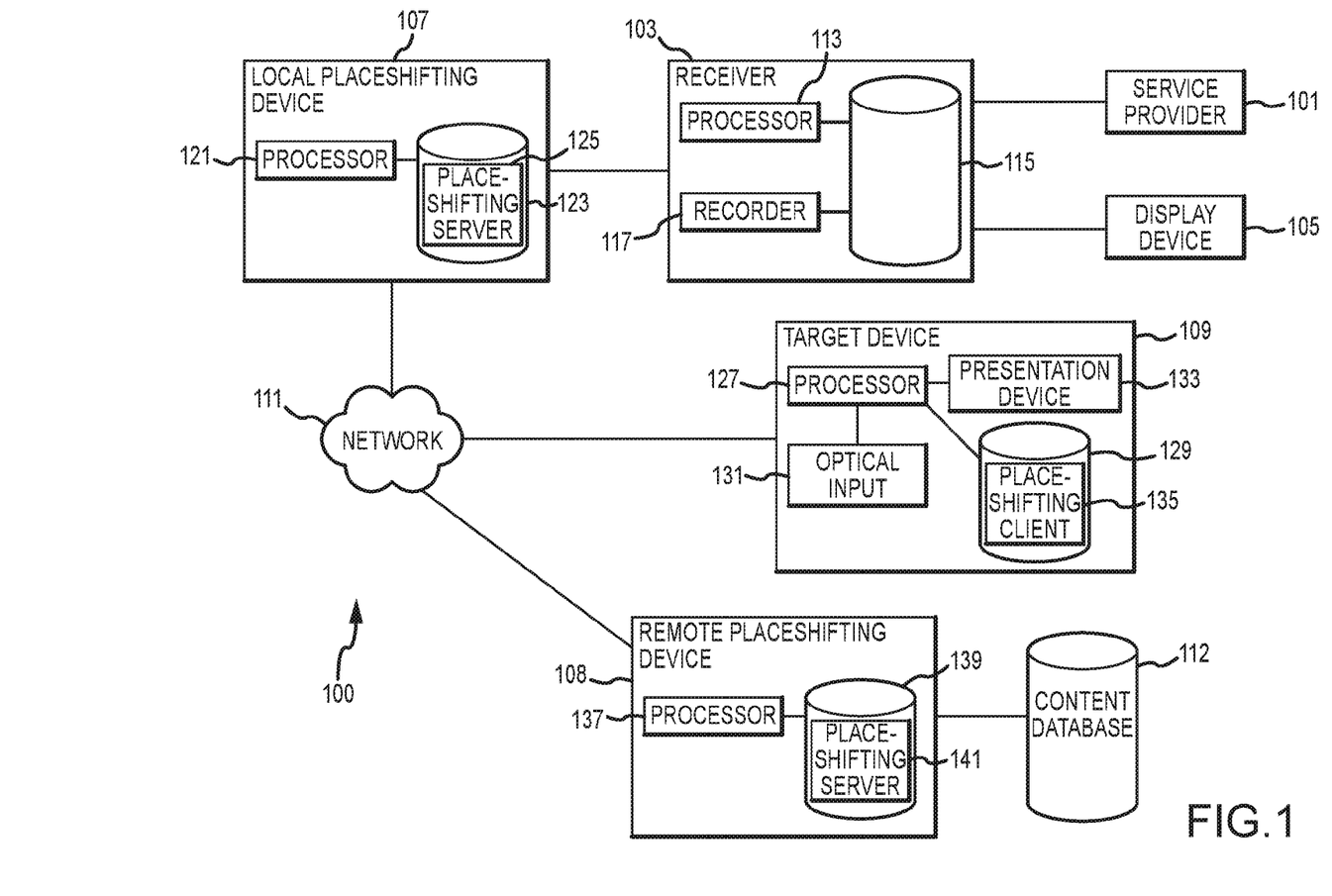
FIG. 1 is a block diagram illustrating a system for receiving and displaying content from one or more placeshifting sources at a target device using matrix code in accordance with some embodiments of the present disclosure.

FIG. 1 is a schematic illustration of a general operating environment 100 showing components and features of embodiments discussed herein. Generally, embodiments discussed herein are directed to receiving and displaying content from one or more placeshifting sources at a target device using matrix code. In some embodiments, the operating environment 100 may include a service provider 101, a content receiver 103, a display device 105, a local placeshifting device 107, and a target device 109. The local placeshifting device 107 may be in communication with the target device 109 over a network 111. The operating environment may further include a remote placeshifting device 108 and a content database 112, which may be in communication with the target device 109 over the network 111.

In illustrative embodiments, the service provider 101 may be any service provider that provides an audio/visual content transmission to the receiver 103 such as, without limitation, a satellite television service, a direct television service or cable television service, or a streaming video delivered across a network such as the Internet.

In various embodiments, the content receiver 103 may represent a first placeshifting source. As used herein, "placeshifting" may refer to an action of a placeshifting source that transfers content which would otherwise be viewed locally at, for example, a user's residence, across a network to be viewed at a remote device such as a mobile electronic device. Generally, the content receiver 103 may be any device capable of receiving video and/or audio content included in a broadcast or other content service transmission from a service provider. For example, the content receiver 103 may be configured to communicate with or receive signals from the service provider 101, which may broadcast, transmit, or otherwise deliver a content service to the content receiver 103. The content receiver 103 may be in the form of, for example, a set-top box, a digital video recorder, a cable receiver, a general purpose computing device, or combinations thereof. The content receiver 103 may also include a cable modem that receives streaming video and/or audio.

In some embodiments, the content receiver 103 may be associated with an individual, business or other entity, user, or subscriber that receives a content service transmission from the service provider 101. Generally the terms "user" and/or "subscriber" refer to individuals or companies that receive the content service transmission. This may include individuals or companies that have purchased a subscription to the content service transmission. Alternatively or additionally, the terms "user" and/or "subscriber" may refer to individuals who have been given access to the content service transmission through promotional offers and/or other non-fee-based agreements. As will be discussed in further detail below, the target device 109 may also be associated with the user or subscriber.

In illustrative embodiments, the content receiver 103 may include one or more processing units 113, one or more one or more non-transitory storage media 115, and a recorder 117.

In some embodiments, the processing unit 113 of the content receiver 103 may be operable to execute instructions stored in the non-transitory storage medium 115 in connection with various functions associated with the receiver 103. For example, the processing unit 113 may display graphics, images, animations and/or other audio/visual content on an integrated display device or the display device 105. Additionally, the processing unit 113 may derive information related to operation of the content receiver 103 and dynamically generate one or more matrix codes that include at least a portion of the derived information, and transmit the dynamically generated matrix code to an integrated display device or a display device 105, such as a television, for display to a user. For example, the matrix codes may be overlaid on or otherwise combined with the audio/visual content provided by the service provider 101.

In some embodiments, the processing unit 113 may dynamically generate the matrix codes for display to a user in response to receiving a user input. For example, a user may utilize a user interface of the content receiver 103 to initiate the generation of a matrix code. Additionally, or alternatively, the processing unit 113 may periodically generate the matrix codes for display to users. As will be discussed in more detail below, the matrix codes generated by the processing unit 113 may be captured by a device with optical reading capabilities such as the target device 109, to facilitate viewing at the target device content which would otherwise be viewed locally at the display device 105. While the present disclosure is described with respect to embodiments in which the matrix codes are generated by the content receiver 103, it is to be appreciated that the matrix codes could be generated by other system devices such as the local placeshifting device 107, and/or be provided in the audio/visual content received from the service provider 101.

In some embodiments, the matrix codes generated by the processing unit 113 may include QR codes. Generally, a "QR code" may refer to a matrix barcode that is readable by scanners, mobile phones, or other electronic device with optical capabilities, which employs geometrical black and white patterns to encode information. The information encoded in the QR code may be referred to herein as "code data."

In various embodiments, the code data may relate to operation of the content receiver 103. For example, the code data may include identifiers (such as network addresses, serial numbers, and/or media access control numbers), configuration information (such as the individual hardware components included in the content receiver 103 and/or identifiers for such components, drivers utilized on the content receiver 103, options set for the content receiver 103), account information for one or more user or subscriber accounts (such as subscription service accounts) associated with the content receiver 103, and/or a location of the content receiver 103 (such as a global positioning system location and/or a mailing address). For instance, in implementations where the content receiver 103 includes a television receiver, the code data may include a serial number for the receiver, a media access control number for the receiver, current settings for the receiver, account information for a programming subscription related to the television receiver, information on hardware included in the television receiver, a mailing address associated with the television receiver and/or other information relating to the receiver 103.

In illustrative embodiments, the code data may also include information regarding the audio/visual content being transmitted to the display device 105 from the content receiver 103 (e.g., a television or movie program being viewed by a user). For example, in embodiments in which the audio/visual content is a television or movie program, the code data may include any or all of: program identifying information, channel identifying information, storage location information, date/time information, elapsed time information (e.g., how far into the program a user is), and/or other information relating to the program. In some embodiments, at least a portion of the foregoing information may be provided to the receiver 103 through a metadata stream associated with the audio/visual content stream received from the service provider 101. As will be discussed in further detail below, the code data may be utilized by the target device 109 to receive placeshifting transmissions relating to the audio/visual content which was being displayed on the display device 105 at the time, or just prior to the time, the matrix code was generated and displayed. For example, the code data may be utilized by the target device 109 to make available at the target device 109 the program from a particular point in the program such as the beginning of the program, the point in the program at which the matrix code was generated and displayed, or any other point in the program desired by a user. It is to be appreciated that the audio/visual content being viewed by a user on the display device 105 may be content that is being transmitted by the service provider 101 or content that has been previously stored to the storage medium 115 of the content receiver 103, such as though operation of the recorder 117.

In some embodiments, the content receiver 103 may include or be associated with a recorder 117, such as a digital video recorder. The recorder 117 may be integrated into the receiver 103 or may be a stand alone device. The recorder 117 may be operated by a user who programs the receiver 103 to record a particular program at a specified time. When the program occurs, the recorder 117 will record and store the program, which can then be viewed later. In addition to this functionality, the recorder 117 may buffer a certain amount of content during a live transmission. Buffering a live transmission allows a user to pause and/or rewind the content of the transmission and to then display the content in a non-live or delayed manner. Additionally, the recorder 117 may be configured to automatically record and store programs for which a user has requested that a matrix code be generated and/or programs for which a matrix code was captured by a user. In this manner, the programs of interest to users may be available for placeshifting transmissions.

The receiver 103 may also include or be associated with a memory or other storage device 115, such as magnetic or optical storage. The storage device 115 may be volatile or non-volatile memory implemented using any suitable technique or technology such as random access memory (RAM), disk storage, flash memory, solid state and/or other suitable storage medium. The storage device 115 may be located within the receiver 103 or separately from the receiver 103.

In some embodiments, the display device 105 may be any kind of display device such as a cathode ray tube display, a liquid crystal display, a television, a computer monitor, or other electronic display device.

In illustrative embodiments, the local placeshifting device 107 may include one or more processing units 121 and one or more non-transitory storage media 123. The processing units 121 may be operable to execute instructions stored in the non-transitory storage media 123 in connection with various functions associated with the local placeshifting device 107. The storage media 123 may take the form of, without limitation: a magnetic storage medium; optical storage medium; magneto-optical storage medium; read only memory; random access memory; erasable programmable memory; flash memory; or other suitable storage medium.

In various embodiments, the storage media 123 may include a placeshifting server 125, which may be configured to be executed by the processing unit 121. Generally, the placeshifting server 125 may be operable to transfer content across the network 111 to the target device 109. Network transactions may be conducted through the operation of a network interface, such as a modem network interface card or cable plug or jack. It should be appreciated that the network 111 may be any type of network capable of data communication, such as a local or wide area network or the Internet.

In illustrative embodiments, the placeshifting server 125 may transfer audio/visual programs or other content, such as television or movie programs received by the receiver 103 from the service provider 101. The placeshifted content may include both live transmissions from the service provider 101 and transmissions that have been stored to the storage device 115 of the receiver 103. The local placeshfiting device 107 may be in communication with the receiver 103 through, for example, a S-video connection, an HDMI connection, or other suitable wired or wireless connection. While the foregoing has been described with respect to embodiments in which the local placeshifting device 107 is provided as a standalone device, it is to be appreciated that the placeshifting device 107 and its components may be integrated into the content receiver 103.

In embodiments in which the local placeshifting device 107 delivers placeshifted content to a remote network end point, the quality of such delivery (e.g., transmission rate, reliability) is dependent on the quality of the network interface available at the physical location of the content receiver 103. For example, if only a "dial-up" network connection is available for delivering placeshifted content across the network 111, the available bandwidth may be insufficient to transmit the placeshifted content to the target device 109 at a rate which is suitable to users. Therefore, it may be desirable to optionally deliver placeshifted content to the target device 109 independent of the network interface available at the physical location of the content receiver 103. In this regard, in some embodiments, the system may further include a remote placeshifting device 108 connected to the network 111 that may function as a second placeshifting source.

In illustrative embodiments, the remote placeshifting device 108 may include one or more processing units 137 and one or more non-transitory storage media 139. The processing unit 137 may be operable to execute instructions stored in the non-transitory storage media 139 in connection with various functions associated with the remote placeshifting device 108. The storage media 139 may take the form of, without limitation: a magnetic storage medium; optical storage medium; magneto-optical storage medium; read only memory; random access memory; erasable programmable memory; flash memory; and/or other suitable storage medium. While the present disclosure is described herein with respect to tasks or functions performed by a single remote placeshifting device 108, it is to be appreciated that any number of computing devices, alone or in combination, independent and/or remote from remote placeshifting device 108, could be used to perform the tasks or functions of the remote placeshifting device 108, or portions thereof.

In various embodiments, the storage media 139 may include a placeshifting server 141, which may be configured to be executed by the processing unit 137. As with the placeshifting server 125, the placeshifting server 141 may be operable to transfer content across the network 111 to the target device 109. Network transactions may be conducted through a reliable, high-speed network interface, such as a broadband connection.

In illustrative embodiments, the remote placeshifting device 108 may be in communication with a content database 112. Generally, the content database 112 may include audio/visual content, such as television and/or movie programs. For example, the content database 112 may include any or all of the audio/visual content which has been transmitted to users by the service provider 101. In this manner, any or all of the audio/visual content which could be stored on the content receiver 103 may also be available for retrieval at the content database 112.

In some embodiments, either or both of the placeshifting server 125 and the placeshifting server 141 may communicate with the target device 109 over the network 111 to placeshift display of content from the receiver 103 to the target device 109. The placeshifting servers 125 and 141 may shift display of content to the target device 109 in order to allow a user to view and/or hear content at a location that is remote from the location of the receiver 103.

In some embodiments, the target device 109 may be in the form of a mobile electronic device such as a cellular phone, smart phone, personal digital assistant, tablet device, or laptop computer. Alternatively, the target device 109 may be a stationary device, such as a desktop computer. The target device 109 may include one or more processing units 127, one or more non-transitory storage media 129, an optical reading device 131, and one or more presentation devices 133 (such as a display screen, a speaker, and/or other suitable presentation component).

In various embodiments, the processing unit 127 may direct the overall operation of the target device 109. A computer program or set of instructions may be coded or otherwise implemented on the processing unit 127 to enable the processing unit 127 to carry out the device operation. As will be described in more detail below, the processing unit 127 may also retrieve and/or process information from the optical reading device 131.

In illustrative embodiments, the storage media 129 may interface with the processing unit 127 and may store program code and provide storage space for data useful in executing the program code and carrying out device functions. The storage media 129 may take the form of, without limitation: a magnetic storage medium; optical storage medium; magneto-optical storage medium; read only memory; random access memory; erasable programmable memory; flash memory; and/or other suitable storage medium). The features and functionality of the target device 109 may be implemented using hardware, software or a combination of hardware and software. If implemented as software, the software may run on the processing unit 127 or be stored in the storage media 129.

In illustrative embodiments, the storage media 129 may include a placeshifting client 135. The placeshifting client 135 may be configured to transmit requests for content input streams from either or both of the placeshifting servers 125, 141. As previously discussed, the placeshifting servers 125, 141 may be in communication with one or more placeshifting sources such as the content receiver 103 or the content database 112 to access and transmit the requested content input stream to the placeshifting client. Upon receipt of the content input stream from the placeshifting servers 125, 141, the placeshifting client 135 may output the received content to the display device 133 of the target device 109.

In some embodiments, requests for content input streams, or placeshifting requests, may be input by users via an appropriate command entered through a user interface of the target device 109. The commands may include, for example, a user making a selection that corresponds to a previously captured matrix code. Upon such selection, the placeshifting client 135 may access the relevant code data, and transmit the placeshifting request based at least in part on the code data.

In illustrative embodiments, the placeshifting client 135 may be configured to determine whether to transmit the placeshifting request to the placeshifting server 125 or the placeshifting server 141 based on the network interface available to the placeshifting servers 125, 141. Such determination may be based, for example, at least in part on the availability and/or quality of the network interface. Additionally, or alternatively, users may manually select to which of the placeshifting servers 125, 141 a placeshifting request is transmitted.

In various embodiments, the target device 109 may connect to the network 111 through a router or gateway, which provides a communication pathway between network endpoints on a local network, and provides a communication pathway for the network end-points to reach globally addressable end-points on a larger network 111, such as the Internet. The router or gateway may be associated with a local area network (LAN), wide area network (WAN), W-Fi network, and/or other suitable communication network. The router or gateway may determine the IP address or other network address used by the target device to connect to the network 111. The target device 109 may additionally include other local-network-specific details or parameters that are used to connect with the target device 109 when it is provided on the local network. Such network-specific parameters may include, for example, connection mechanisms and/or network passwords.

In various embodiments, the target device 109 may include an optical reading device 131 such as, for example, a camera, a laser scanner, or other digital recording device. The optical reading device 131 may be integrated into the target device 109 or provided as a separate component in communication with the target device 109. The optical reading device 131 may be configured to detect and/or record a machine readable code, such as a matrix code, which has been made available to a user of the target device 109.

In some embodiments, the processing unit 127 may be configured such that upon capture of a matrix code, via the optical reading device 131, the processing unit 127 decodes the matrix code to obtain the code data embedded therein. Additionally, the processing unit 127 may be configured to store the code data to the storage media 129 for subsequent retrieval.

Figure 2:
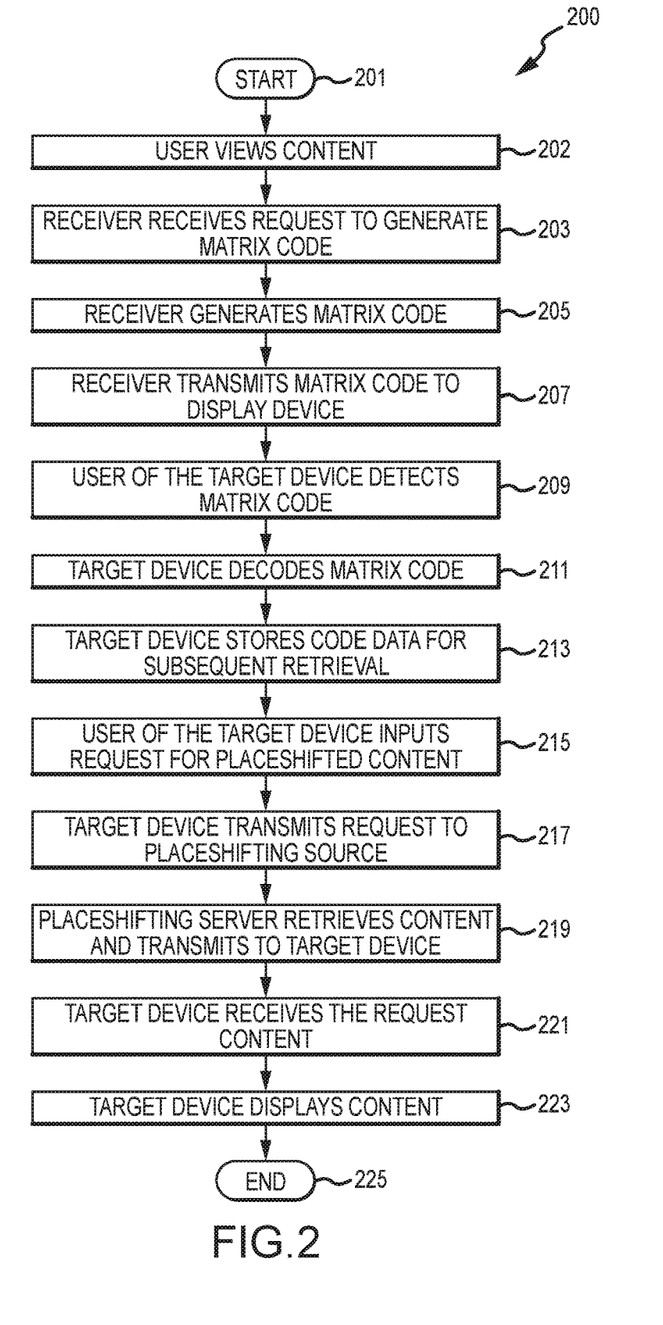
FIG. 2 is a flow chart illustrating a method for facilitating placeshifting transmissions to users of a target device using matrix code in accordance with some embodiments of the present disclosure. This method may be performed by the system of FIG. 1.

FIG. 2 illustrates a method 200 for facilitating placeshifting transmissions to users of a target device using matrix code in accordance with some embodiments of the present disclosure. The method 200 may be performed by the system 100 of FIG. 1. The flow begins at block 201 and may proceed to block 202 where a user views content, such as a television or movie program being transmitted from the receiver 103 to the display device 105. At block 203, the receiver 103 may, at a point prior to completion of the program being viewed by the user, receive a request to generate a matrix code. A user may input the matrix code request, for example, by entering an appropriate command though a user interface of the receiver 103 or target device 109. Alternatively, the receiver 103 may automatically generate matrix codes on a periodic bases. At block 205, the processing unit 113 may generate a matrix code that includes at least information regarding the content being transmitted by the receiver 103 for display to the display device 105. The information regarding the content being transmitted by the receiver 103 may include at least program identifying information (e.g., program name, unique ID) and elapsed time information (e.g., how far into the program a user is). At block 207, the processing unit 113 may transmit the generated matrix code to the display device 105.

At block 209, a user of the target device 109 may employ the optical reading device 131 to detect and/or record the matrix code, which has been made available on the display device 105. At block 211, the processing unit 127 of the target device 101 may decode the matrix code. At block 213, the processing unit 127 may store the code data to the storage media 129 for subsequent retrieval.

At block 215, a user of the target device 109, which at this point may be at a remote location, may input a request for placeshifted content. A user may input the placeshifting request by, for example, entering an appropriate command through a user interface of the target device 109. The commands may include a user making a selection relating to the previously captured matrix code. In so doing, the user may select to receive content that is available at receiver 103, such as content corresponding to the at least partially viewed program of block 202. For example, the selected content may include at least that portion of the program of block 202 that follows the point of the program at which the matrix code of block 203 was requested. Alternatively, the selected content may include any portion of the program of block 202, including the entire program.

At block 217, the placeshifting client 135 of the target device 109 may initiate a network transaction across the network 111 to a placeshifting source. The transaction may include transmission of the placeshifting request to one of the placeshifting servers 125, 141. At block 219, the placeshifting server 125, 141 that receives the placeshift request may retrieve the content corresponding to the placeshift request, and transmit such content in a network transaction across the network 111 to be received by the placeshifting client 135.

At block 221, the placeshifting client 135 may receive the requested content. At block 223, the placeshifting client 135 may output the placeshifted content on the presentation device 133 of the target device 109. For example, the outputted placeshifted content may include the program of block 202, from the point in the program at which the matrix code of block 203 was requested and displayed. Alternatively, the outputted placeshifted content may include the program of block 202 from any point in the program. The flow may then proceed to block 225 and end.

It should be understood that the specific steps as well as the specific order or hierarchy of steps described in method 200 is an example of a sample approach. In other implementations, some of the specific steps as well as the specific order or hierarchy of steps in the method may be rearranged while remaining within the disclosed subject matter.

Figure 3A:
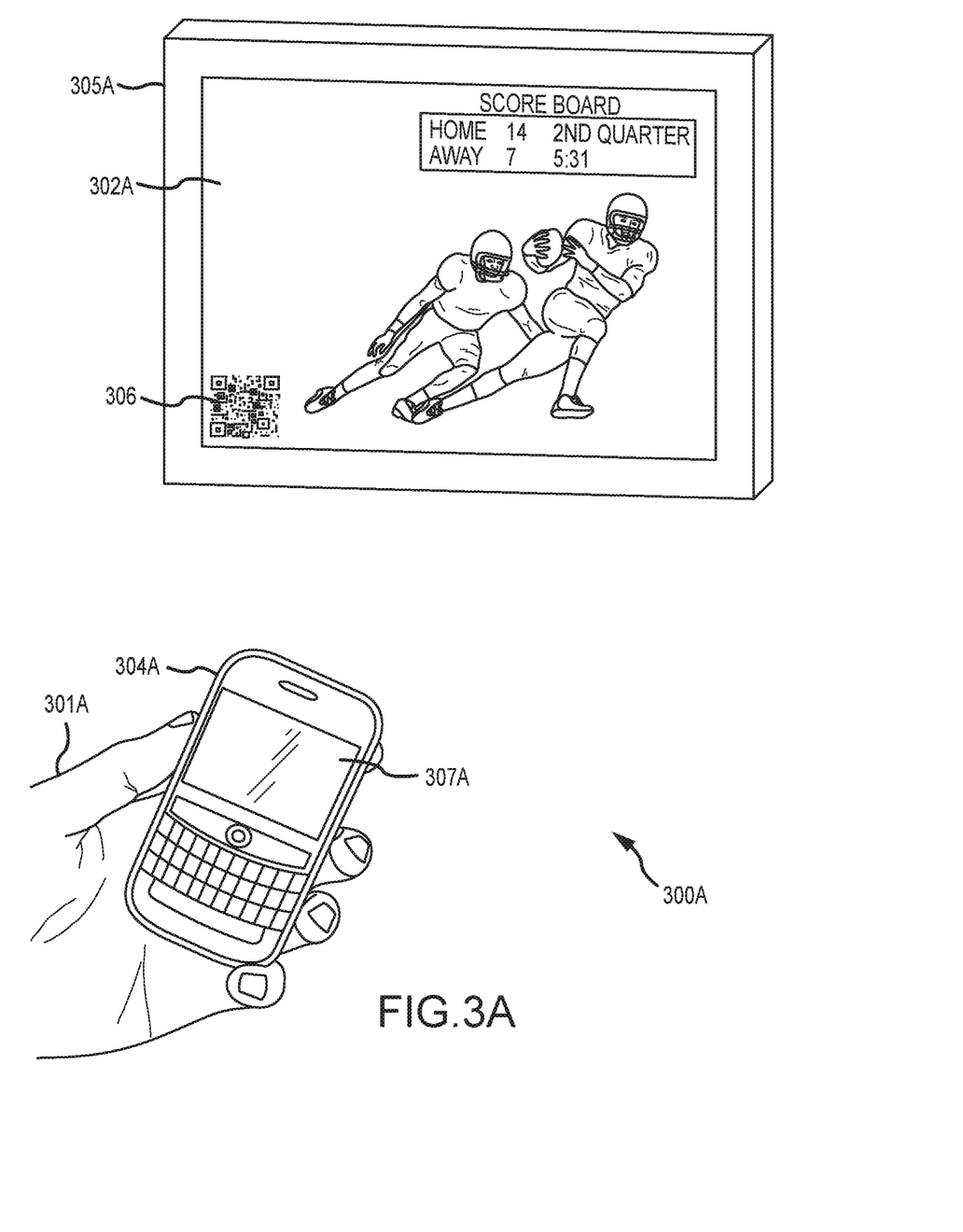
FIGS. 3A-3B are diagrams illustrating an example system for providing a user of a target device with placeshifted content utilizing matrix code. The system may be the system of FIG. 1.
Figure 3B:
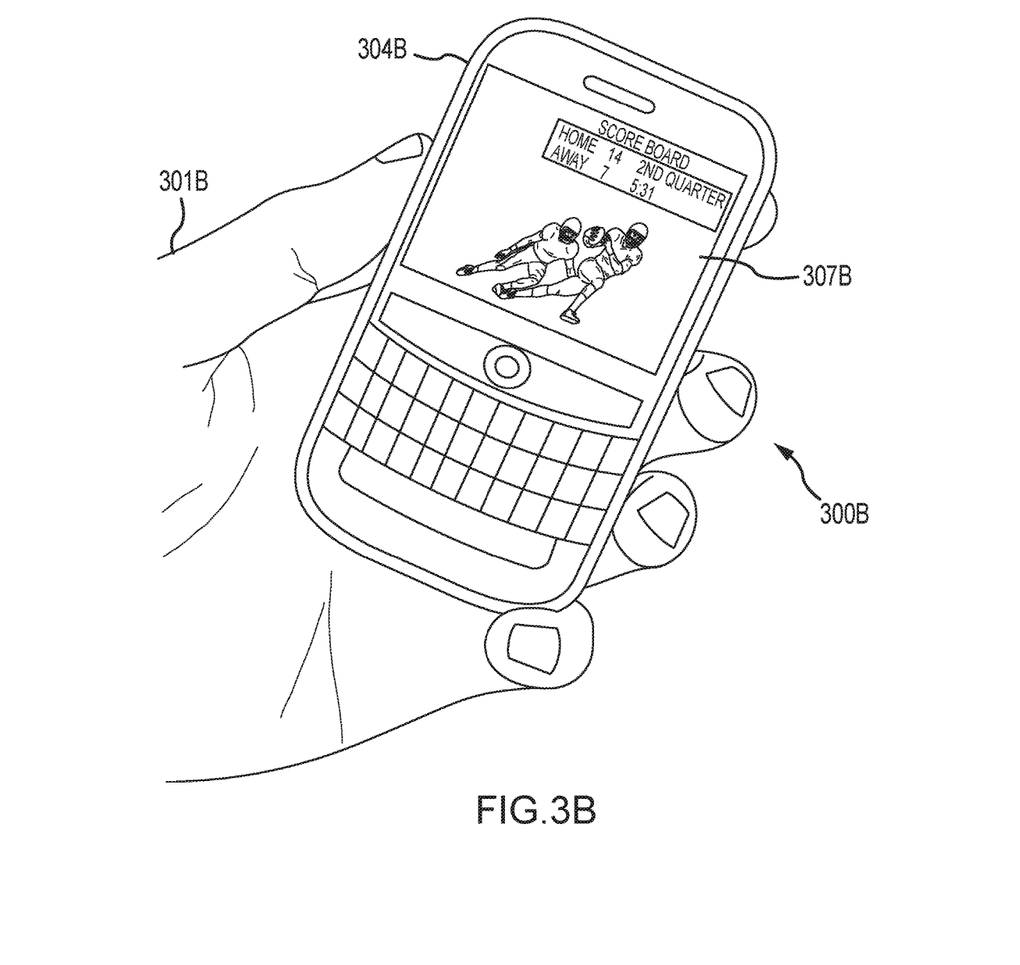

FIGS. 3A-3B illustrate an example system 300A-300B for providing a user 301A-301B of a target device 304A-304B with placeshifted content utilizing matrix code. The system may be the system of FIG. 1. As illustrated in FIG. 3A, a user 301A is viewing a program that is being displayed on a television screen 302A of a television 305A. Also as illustrated, the user 301A possesses a target device 304A which he may utilize to capture one or more matrix codes 306 displayed during the program. In order to receive placeshift transmission of the program, the user 301A takes a picture of the matrix code 306 on the screen 302A of the television 305A with the target device 304A that is executing a matrix code reader program. The matrix code reader program decodes the matrix code and stores the code data. The code data includes information identifying the program and the point in the program that the matrix code was captured. At some later point, when the target device 304B is at a remote location, the user 301B inputs a request for a placeshift transmission of the program at the point in the program that the matrix code was captured. Based on the stored code data, the target device 304B transmits the placeshift request to a placeshift device. The placeshift device retrieves the content corresponding to the placeshift request and transmits this content to the target device 304B. FIG. 3B depicts the placeshift transmission of the program received by the target device 304B and displayed to the user 301B on a display screen 307B.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and/or other suitable storage medium.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for providing content with a target device, the method comprising:

optically detecting, via an optical input device of a target device, a matrix code when the matrix code is displayed on a presentation device, wherein:

the matrix code was generated, by a content receiver that is separate from the target device, based at least in part on audiovisual content and/or data associated with the audiovisual content transmitted from a service provider to the content receiver, wherein the audiovisual content is at least partially recorded upon generation of the matrix code and stored in a storage location; and data encoded in the matrix code comprises program identifying information and elapsed time information with respect to the audiovisual content;

when the target device is in a first location, decoding, by the target device, the matrix code, and storing code data corresponding to the decoded matrix code in the target device for subsequent retrieval;

when the target device is in a second location that is remote from the first location, generating, by the target device, a request based at least in part on the stored code data to receive, at the target device, at least a portion of the audiovisual content using the data encoded in the matrix code;

transmitting, by the target device, the request for at least the portion of the audiovisual content across a network to a first device configured to access the at least the portion of the audiovisual content recorded in the storage location, wherein the first device is local to the content receiver; and responsive to the request, receiving, over the network by the target device from the first device, the at least the portion of the audiovisual content from the first device.

2. The method of claim 1, wherein the transmitting the request for at least the portion of the audiovisual content comprising transmitting the request to the first device and a second device, and the method further comprises:

determining available bandwidths from each of the first device and the second device; and wherein at least the portion of the audiovisual content is received from the first device consequent to a determination that the first device has a higher available bandwidth than the second device.

3. The method of claim 1, further comprising outputting for display, via a display of the target device, the at least the portion of the audiovisual content.

4. The method of claim 1, wherein the matrix code is detected at a geographical location, and the at least the portion of the audiovisual content transmitted by the first device is retrieved by the first device from the storage location where the storage location is remote with respect to the geographical location.

5. The method of claim 1, wherein the request comprises a request for the at least the portion of the audiovisual content commencing at or about a point in a program at which the matrix code was detected.

6. The method of claim 5, wherein the program is a television program or a movie program.

7. The method of claim 6, wherein the request specifies that the first device retrieve the at least the portion of the audiovisual content from the storage location where the storage location is associated with the content receiver.

8. The method of claim 1, wherein the matrix code comprises a quick response code.

9. The method of claim 1, wherein the storage location is within the content receiver.

10. The method of claim 1, wherein the storage location is remote from the content receiver.

11. A target device to provide content, the target device comprising:

an optical input device configured to optically detect matrix codes;

a network interface; and one or more processors communicably coupled to the optical input device and the network interface and configured to send and receive transactions across a network though the network interface, wherein the one or more processors are provided with instructions that, when executed by the one or more processors, cause the target device to perform:

optically detecting, via the optical input device, a matrix code when the matrix code is displayed on a presentation device, wherein:

the matrix code was generated, by a content receiver that is separate from the target device, based at least in part on audiovisual content and/or data associated with the audiovisual content transmitted from a service provider to the content receiver, wherein the audiovisual content is at least partially recorded upon generation of the matrix code and stored in a storage location; and data encoded in the matrix code comprises program identifying information and elapsed time information with respect to the audiovisual content;

when the target device is in a first location, decoding the matrix code, and storing code data corresponding to the decoded matrix code in the target device for subsequent retrieval;

when the target device is in a second location that is remote from the first location, generating a request based at least in part on the stored code data to receive, at the target device, at least a portion of the audiovisual content using the data encoded in the matrix code;

transmitting the request for at least the portion of the audiovisual content across a network to a first device configured to access the at least the portion of the audiovisual content recorded in the storage location, wherein the first device is local to the content receiver; and responsive to the request, receiving, over the network from the first device, at least the portion of the audiovisual content from the first device.

12. The target device of claim 11, wherein the transmitting the request for at least the portion of the audiovisual content comprising transmitting the request to the first device and a second device, and the instructions further cause the target device to perform:

determining available bandwidths from each of the first device and the second device; and wherein at least the portion of the audiovisual content is received from the first device consequent to a determination that the first device has a higher available bandwidth than the second device.

13. The target device of claim 11, wherein the instructions further cause the target device to perform outputting for display, via a display of the target device, at least the portion of the audiovisual content.

14. The target device of claim 11, wherein the matrix code is detected at a geographical location, and the at least the portion of the audiovisual content transmitted by the first device is retrieved by the first device from the storage location where the storage location is remote with respect to the geographical location.

15. The target device of claim 11, wherein the request comprises a request for the at least the portion of the audiovisual content commencing at or about a point in a program at which the matrix code was detected.

16. The target device of claim 15, wherein the program is a television program or a movie program.

17. The target device of claim 16, wherein the request specifies that the first device retrieve the at least the portion of the audiovisual content from the storage location where the storage location is associated with the content receiver.

18. The target device of claim 11, wherein the matrix code comprises a quick response code.

19. The target device of claim 11, wherein the storage location is within the content receiver.

20. The target device of claim 11, wherein the storage location is remote from the content receiver.

\* \* \* \* \*